(12) United States Patent
Kanda et al.

(10) Patent No.: US 9,570,972 B2
(45) Date of Patent: Feb. 14, 2017

(54) CR SNUBBER CIRCUIT

(71) Applicant: MITSUBISHI ELECTRIC CORPORATION, Chiyoda-ku, Tokyo (JP)

(72) Inventors: Mitsuhiko Kanda, Chiyoda-ku (JP); Shizuri Tamura, Chiyoda-ku (JP); Akira Hatai, Chiyoda-ku (JP); Yasuhiro Sekimoto, Chiyoda-ku (JP); Yuji Nojiri, Chiyoda-ku (JP); Yoshitomo Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 422 days.

(21) Appl. No.: 14/364,363

(22) PCT Filed: Oct. 2, 2013

(86) PCT No.: PCT/JP2013/076822
§ 371 (c)(1),
(2) Date: Jun. 11, 2014

(87) PCT Pub. No.: WO2015/049736
PCT Pub. Date: Apr. 9, 2015

(65) Prior Publication Data
US 2016/0344279 A1 Nov. 24, 2016

(51) Int. Cl.
*H02H 9/04* (2006.01)
*H02M 1/34* (2007.01)
(Continued)

(52) U.S. Cl.
CPC .............. *H02M 1/34* (2013.01); *H02H 9/045* (2013.01); *H02H 7/122* (2013.01); *H02M 1/32* (2013.01);
(Continued)

(58) Field of Classification Search
USPC ...................................... 361/91.1, 91.7, 91.8
See application file for complete search history.

(56) References Cited

U.S. PATENT DOCUMENTS 6,219,260 B1 4/2001 Gotoh et al.
2010/0328975 A1* 12/2010 Hibino .................. H02M 7/003
363/126

FOREIGN PATENT DOCUMENTS

JP 3-2669 U 1/1991
JP 3-55897 A 3/1991
(Continued)

OTHER PUBLICATIONS

Communication dated Feb. 16, 2015, issued by the Korean Intellectual Property Office in counterpart Korean application No. 10-2014-7021051.
(Continued)

*Primary Examiner* — Danny Nguyen
(74) *Attorney, Agent, or Firm* — Sughrue Mion, PLLC; Richard C Turner

(57) ABSTRACT

A CR snubber circuit capable of increasing a reduction effect of the effective inductance component and suppressing a ringing component generated at the time of switching the switching element is obtained. A first current path formed on one surface of the substrate and a second current path formed on the other surface, which is the opposite side of the one surface of the substrate, are opposed to each other with the substrate being sandwiched therebetween, and the capacitor 5 and the resistor 6 are arranged such that current flows in opposite directions in the first current path and the second current path, and a band elimination filter is formed by the capacitor 5, the resistor 6, and an effective inductance component obtained by coupling an inductance component
(Continued)

included in the first current path and an inductance component included in the second current path.

12 Claims, 23 Drawing Sheets

(51) Int. Cl.
    *H02M 1/32*     (2007.01)
    *H02H 7/122*     (2006.01)

(52) U.S. Cl.
    CPC . *H02M 2001/346* (2013.01); *H02M 2001/348* (2013.01)

(56) References Cited

FOREIGN PATENT DOCUMENTS

| | | |
|---|---|---|
| JP | 9-64508 A | 3/1997 |
| JP | 3045842 U | 11/1997 |
| JP | 2000-354389 A | 12/2000 |
| JP | 2001-86770 A | 3/2001 |
| JP | 2003-219661 A | 7/2003 |
| JP | 2003-319665 A | 11/2003 |
| JP | 2007-188646 A | 7/2007 |
| JP | 2008-85958 A | 4/2008 |
| JP | 2009-225612 A | 10/2009 |
| JP | 4929298 B2 | 5/2012 |
| JP | 5169353 B2 | 3/2013 |
| KR | 20-1995-028832 Y1 | 10/1995 |

OTHER PUBLICATIONS

International Search Report of PCT/JP2013/076822, dated Jan. 7, 2014.

\* cited by examiner (a)            (b)

(a)          (b)

LEFT SIDE SURFACE

RIGHT SIDE SURFACE

LEFT SIDE SURFACE | RIGHT SIDE SURFACE

LEFT SIDE SURFACE | RIGHT SIDE SURFACE

LEFT SIDE SURFACE | RIGHT SIDE SURFACE

CR SNUBBER CIRCUIT

CROSS REFERENCE TO RELATED APPLICATIONS

This application is a National Stage of International Application No. PCT/JP2013/076822 filed Oct. 2, 2013, the contents of all of which are incorporated herein by reference in their entirety.

FIELD

The present invention relates to a CR snubber circuit.

BACKGROUND

When a switching element such as a power semiconductor module is switched off, a spike-like surge voltage is generated. When the surge voltage is large, there is a risk of causing a short-circuit breakdown of the switching element. Conventionally, there is disclosed a technique in which, by connecting snubber capacitors and semiconductor modules with metallic bars having a relatively high conductivity and wiring on the substrates, the impedance components between the snubber capacitors and the semiconductor modules are made lower, to reduce the spike-like surge voltage that flows when the switching element is switched off, and, for adjacent semiconductor modules, by equalizing the wiring length between the snubber capacitors, the impedance components for respective semiconductor modules are made substantially equal, which results in equalization of protection effects from a surge voltage among the respective semiconductor modules (for example, Patent Literature 1).

CITATION LIST

Patent Literature

Patent Literature 1: Japanese Patent Application Laid-open No. 2003-219661

SUMMARY

Technical Problem

The above conventional technique discloses a configuration in which electric currents having opposite polarities are supplied to the respective conductor plates disposed adjacent to each other with an insulating material arranged therebetween. With this configuration, the mutual inductance component between the conductor plates increases and the effective impedance component of the wiring can be reduced, which facilitates protection from the surge voltage by the snubber capacitors. However, the above conventional technique is silent on symmetry of current paths including arrangements of parts, and there is a problem in that a sufficient reduction effect of the effective inductance component cannot be obtained in some cases.

Further, after switching off the switching element, subsequent to the spike-like surge voltage, a ringing component that oscillates with a higher frequency is generated. While the ringing component becomes a noise source to a voltage or a load, the above conventional technique is directed to reduction of the spike-like surge voltage that flows when switching off the switching element with a frequency lower than that of the ringing component. Therefore, the above conventional technique has a problem in that it is difficult to also reduce the ringing component that oscillates with a higher frequency.

The present invention has been achieved in view of the above problems, and an object of the present invention is to provide a CR snubber circuit that can improve a reduction effect of the effective inductance component and can suppress the ringing component that is generated when the switching element is switched on.

Solution to Problem

In order to solve the above problems and achieve the object, a CR snubber circuit according to the present invention is a CR snubber circuit that is formed on a substrate and that includes a capacitor and a resistor that are connected in series between DC terminals that apply DC voltage to a power semiconductor module that is formed with inclusion of a switching element, wherein a first current path formed on one surface of the substrate and a second current path formed on another surface, which is an opposite side of the one surface of the substrate, are opposed to each other with the substrate being sandwiched therebetween, the capacitor and the resistor are arranged such that current flows in opposite directions in the first current path and the second current path, and a band elimination filter is formed by the capacitor, the register, and an effective inductance component obtained by coupling an inductance component included in the first current path and an inductance component included in the second current path.

Advantageous Effects of Invention

According to the present invention, an effect is obtained where it is possible to improve a reduction effect of the effective inductance component and to suppress the ringing component that is generated when the switching element is switched on.

DESCRIPTION OF EMBODIMENTS

Exemplary embodiments of a CR snubber circuit according to the present invention will be explained below in detail with reference to the accompanying drawings. The present invention is not limited to the embodiments.

First Embodiment

Figure 1:
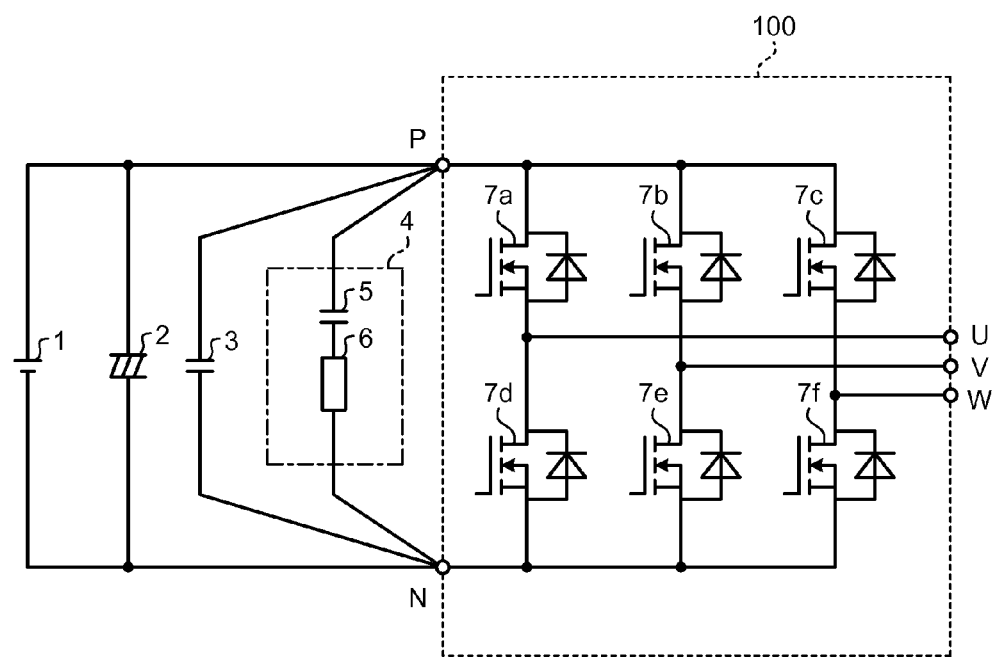
FIG. 1 is a diagram showing a configuration example of a power semiconductor module to which a CR snubber circuit according to a first embodiment is applied.

FIG. 1 is a diagram showing a configuration example of a power semiconductor module to which a CR snubber circuit according to a first embodiment is applied. In the example shown in FIG. 1, a configuration where a plurality of switching elements 7a to 7f are full-bridge connected to form a power semiconductor module 100, direct current (DC) power is supplied from a DC power source 1 that is connected between DC terminals P and N, and a three-phase alternating current (AC) power is supplied to a load (not shown) that is connected to output terminals U, V, and W. The configuration of the power semiconductor module 100 is not limited thereto, and may be, for example, a configuration formed by four switching elements in full-bridge connection, a configuration that is formed by one switching element or two switching elements and supplies DC power supplied from the DC power source 1 to a load after stepping down or stepping up the DC power supplied, or a configuration in which AC power is supplied from an AC power source instead of the DC power source 1. That is, the power semiconductor module 100 has only to be a configuration including one or more switching elements, and the present invention is not limited to the above configurations of the power semiconductor module 100. Also, a circuit configuration in which, instead of the DC power source 1, an AC power supply is rectified by a diode can be used.

A smoothing capacitor 2, a snubber capacitor 3, and a CR snubber circuit 4 according to the first embodiment are connected between the DC terminals P and N of the power semiconductor module 100.

The smoothing capacitor 2 mainly has a function of smoothing the DC power source 1, and the snubber capacitor 3 has a function of suppressing the spike-like surge voltage that is generated when the switching elements 7a to 7f constituting the power semiconductor module 100 are switched off.

The CR snubber circuit 4 according to the first embodiment is configured to include a capacitor 5 and a resistor 6 that are connected in series, and has a function of suppressing the ringing component that oscillates with a higher frequency and is generated subsequent to the spike-like surge voltage after switching off the switching elements 7a to 7f. The ringing component is generated due to the parasitic inductance component included in the power semiconductor module 100.

Figure 2:
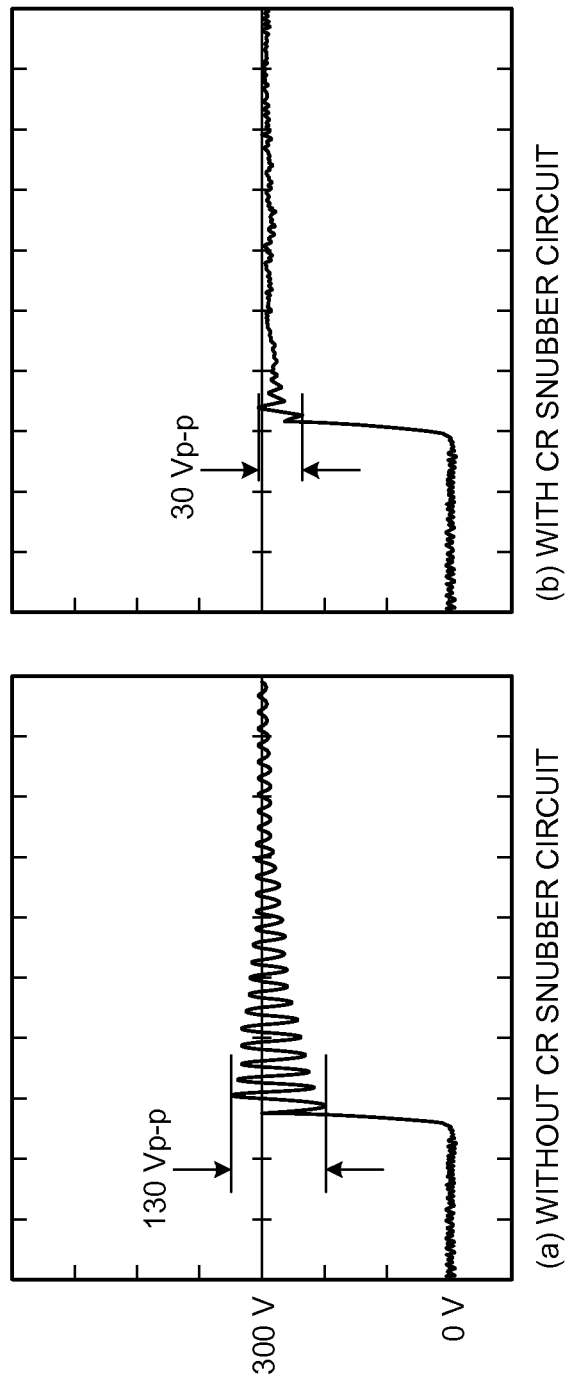
FIG. 2 is a diagram showing examples of waveforms of an output voltage to a load before and after switching off a switching element.
Figure 3:
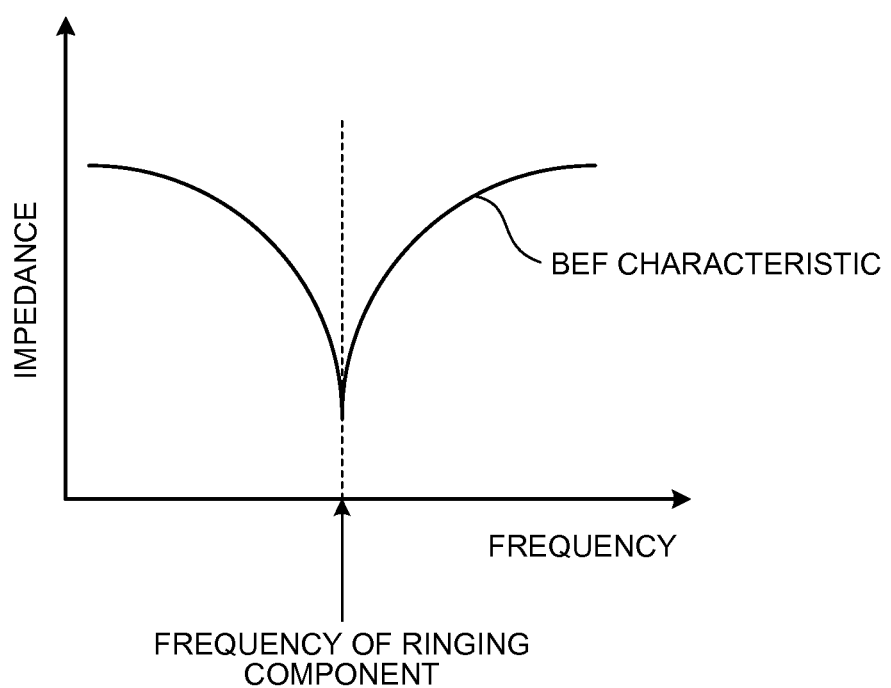
FIG. 3 is a diagram showing an example of the frequency characteristics of the CR snubber circuit according to the first embodiment.

FIG. 2 is a diagram showing examples of waveforms of an output voltage to a load before and after switching off the switching element. FIG. 2(a) depicts a waveform of an output voltage when the CR snubber circuit according to the first embodiment is not mounted, and FIG. 2(b) depicts a waveform of an output voltage when the CR snubber circuit according to the first embodiment is mounted. FIG. 3 is a diagram showing an example of the frequency characteristics of the CR snubber circuit according to the first embodiment.

In contrast to the fact that the snubber capacitor 3 has a capacitance of approximately 0.1 microfarads (μF) to 1 μF, for example, the capacitor 5 that constitutes the CR snubber circuit 4 has a capacitance of approximately several nanofarads (nF) to several tens of nF, for example, and forms a BEF (Band Elimination Filter) that attenuates the ringing component with a frequency higher than that of the surge voltage generated at the time of switching off the switching elements 7a to 7f, with the inductance component included in the current path of the CR snubber circuit 4 (see FIG. 3). By the BEF, it is possible to attenuate the ringing component that is generated due to the parasitic inductance component included in the power semiconductor module 100. Furthermore, in the present embodiment, by having a configuration in which the resistor 6 of, for example, approximately several ohms (Ω) is connected to the capacitor 5 in series, the ringing component attenuation effect is made greater.

When the CR snubber circuit according to the first embodiment is not mounted, as shown in FIG. 2(a), ringing with a peak value of approximately 130 Vp-p at a maximum is generated after switching off the switching elements, whereas when the CR snubber circuit 4 according to the present embodiment is mounted, as shown in FIG. 2(b), the peak value of ringing generated after switching off the switching elements is suppressed to approximately 30 Vp-p.

Figure 4:
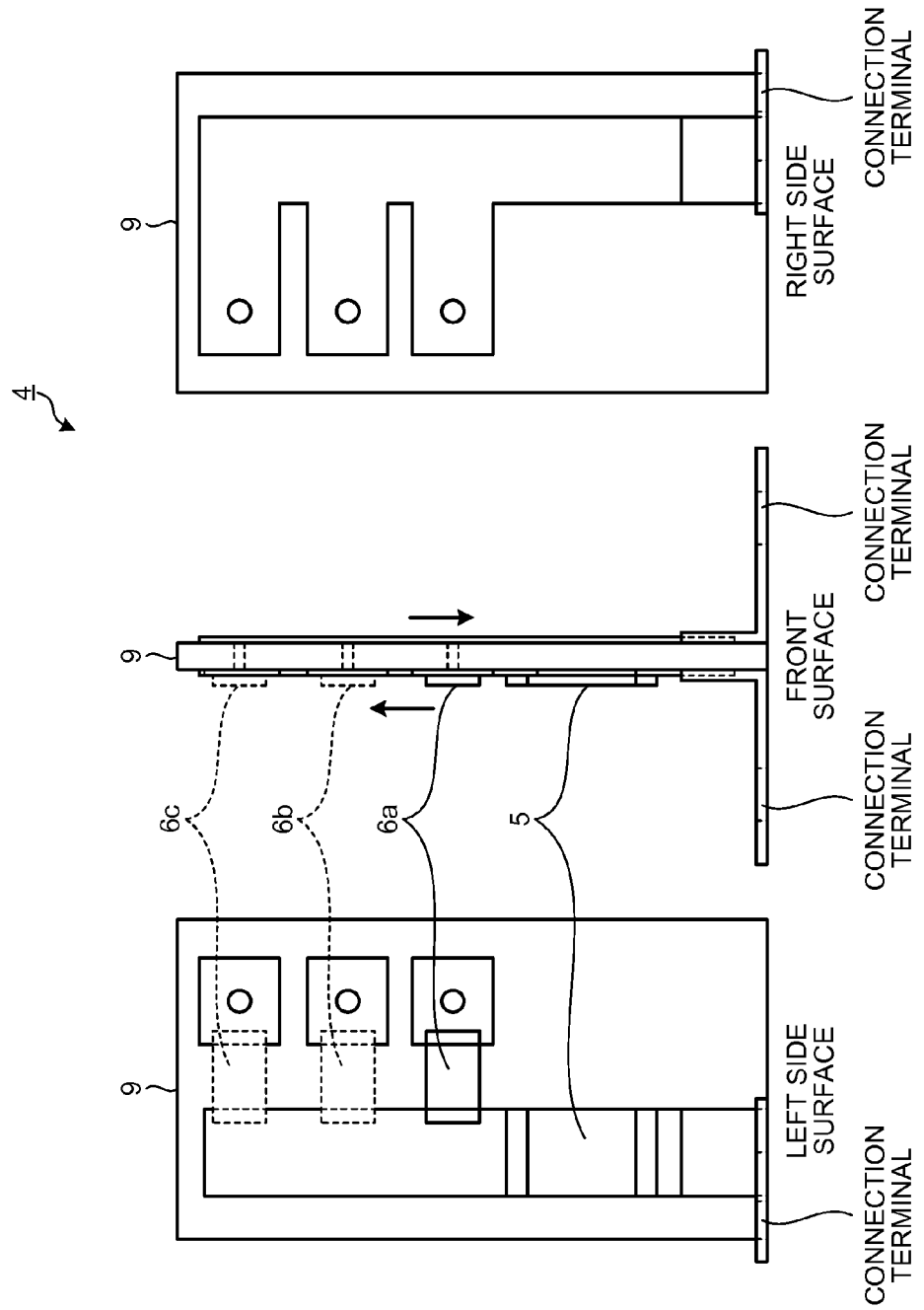
FIG. 4 is a diagram showing an example of mounting the CR snubber circuit according to the first embodiment on a substrate.
Figure 5:
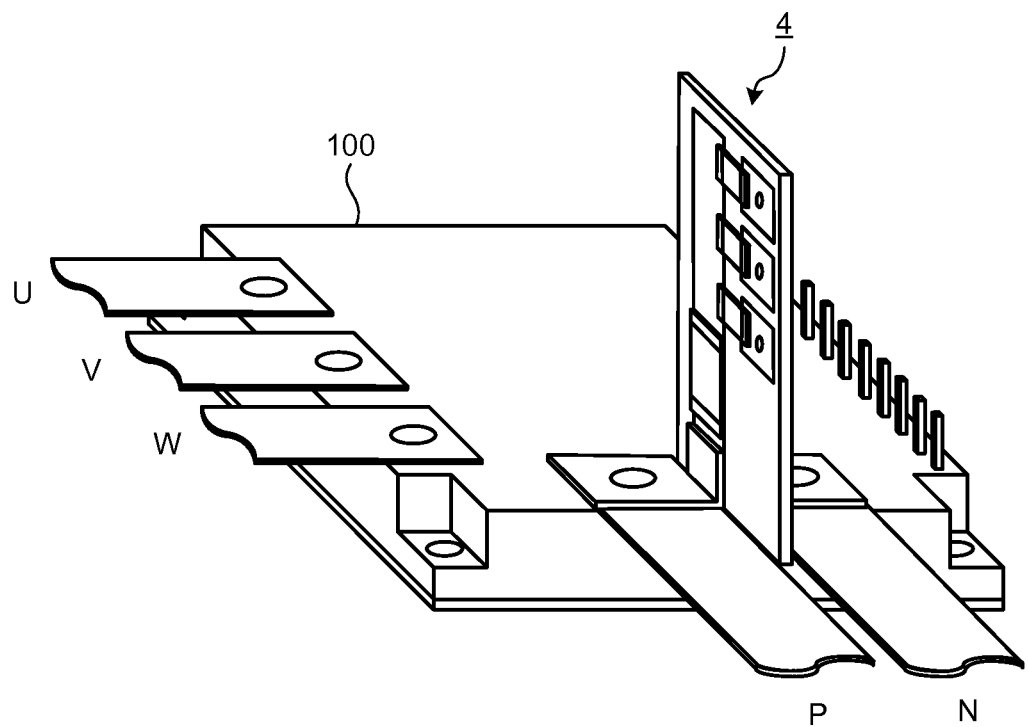
FIG. 5 is a diagram showing an example of mounting the substrate, on which the CR snubber circuit shown in FIG. 4 is mounted, on the power semiconductor module.
Figure 6:
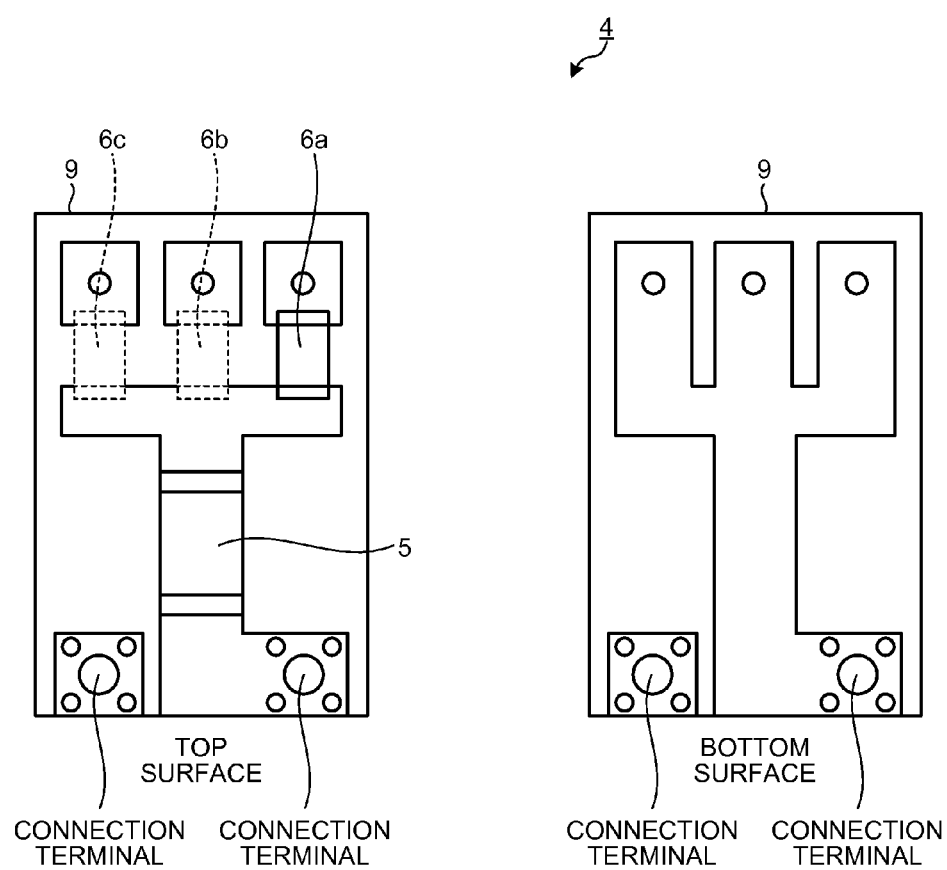
FIG. 6 is a diagram showing an example of mounting, in a different manner from FIG. 4, the CR snubber circuit according to the first embodiment on the substrate.
Figure 7:
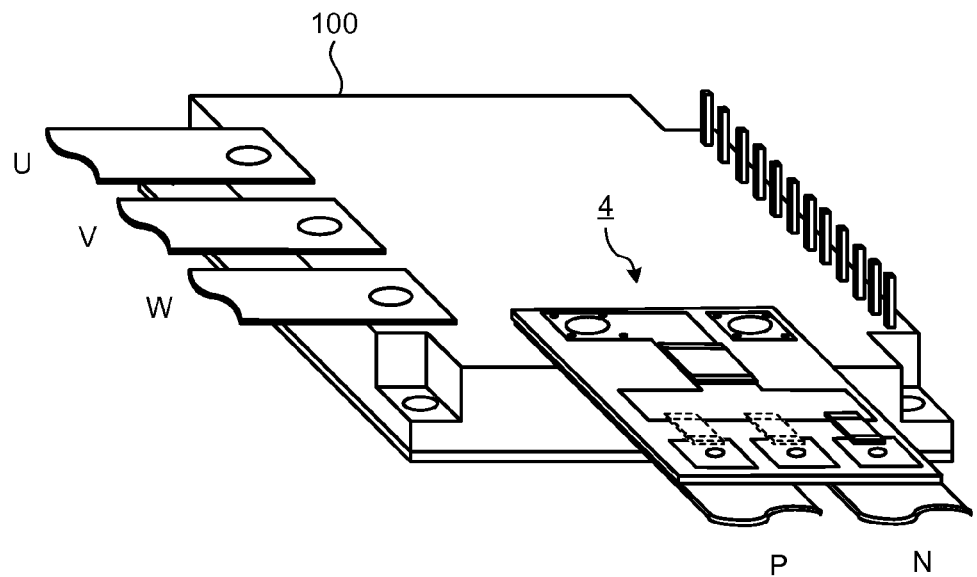
FIG. 7 is a diagram showing an example of mounting the substrate, on which the CR snubber circuit shown in FIG. 6 is mounted, on the power semiconductor module.
Figure 8:
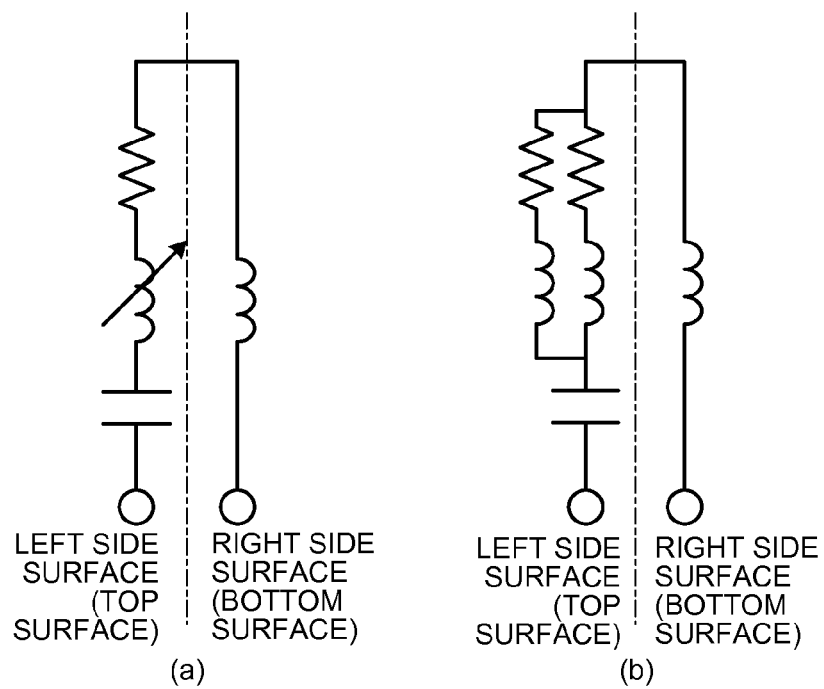
FIG. 8 is a diagram showing equivalent circuits of the CR snubber circuits shown in FIGS. 4 and 6.

FIG. 4 is a diagram showing an example of mounting the CR snubber circuit according to the first embodiment on the substrate. FIG. 5 is a diagram showing an example of mounting the substrate, on which the CR snubber circuit shown in FIG. 4 is mounted, on the power semiconductor module. FIG. 6 is a diagram showing an example of mounting, in a different manner from FIG. 4, the CR snubber circuit according to the first embodiment on the substrate. FIG. 7 is a diagram showing an example of mounting the substrate, on which the CR snubber circuit shown in FIG. 6 is mounted, on the power semiconductor module. FIG. 8 is a diagram showing equivalent circuits of the CR snubber circuits shown in FIGS. 4 and 6.

In the examples shown in FIGS. 4 and 6, surface-mount type capacitor 5 and resistor 6a are mounted on one surface (the left side surface in FIG. 4 and the top surface in FIG. 6) of a double-sided substrate 9 (see FIG. 8(a)), and the first current path formed with the inclusion of the capacitor 5 and the resistor 6a is arranged to be opposed to the second current path formed with a wiring pattern on the other surface (the right side surface in FIG. 4 and the bottom surface in FIG. 6) of the double-sided substrate 9 with the double-sided substrate 9 being sandwiched therebetween. With this configuration, current flows in opposite directions in the first current path and the second current path (see the front view in FIG. 4), and the inductance component included in the first current path and the inductance component included in the second current path are coupled to increase the mutual inductance component. Therefore, the effective inductance component in the whole current path of the CR snubber circuit 4 can be reduced, and thus the capacitance value of the capacitor 5 can be made small, thereby facilitating suppression of the ringing component.

A plurality of mounting positions for the resistor 6 shown in FIG. 1 are provided, and the examples shown in FIGS. 4 and 6 show examples of mounting the resistor 6a thereon. However, a resistor 6b or a resistor 6c can be mounted instead of the resistor 6a, and the resistors 6a to 6c can be mounted in parallel (see FIG. 8(b)). By changing the mounting position and the number of the resistors 6 to be mounted in this way, the inductance component included in the current path and the BEF characteristics can be easily changed. Therefore, the ringing component attenuation effect can be optimized.

As explained above, according to the CR snubber circuit in the first embodiment, the CR snubber circuit is provided between the DC terminals P and N of the power semiconductor module, and when forming the BEF that attenuates a frequency band including the ringing component with the frequency that is higher than that of the surge voltage generated when the switching element is switched off, with the inductance component included in the current path of the CR snubber circuit, the surface-mount type capacitor and resistor are mounted on one surface of the double-sided substrate and the first current path formed with the inclusion of the capacitor and the resistor is arranged to be opposed to the second current path formed with the wiring pattern on the other surface of the double-sided substrate with the double-sided substrate being sandwiched therebetween. Accordingly, current flows in opposite directions in the first current path and the second current path and the inductance component included in the first current path and the inductance component included in the second current path are coupled to increase the mutual inductance component. Therefore, the effective inductance component in the whole current path of the CR snubber circuit can be reduced, and thus the capacitance value of the capacitor can be made small, thereby facilitating suppression of the ringing component.

Furthermore, because a plurality of mounting positions for the resistor are provided, by changing the mounting position and the number of resistors to be mounted, the inductance component included in the current path and the BEF characteristics can be changed easily. Therefore, the ringing component attenuation effect can be optimized.

Second Embodiment

Figure 9:
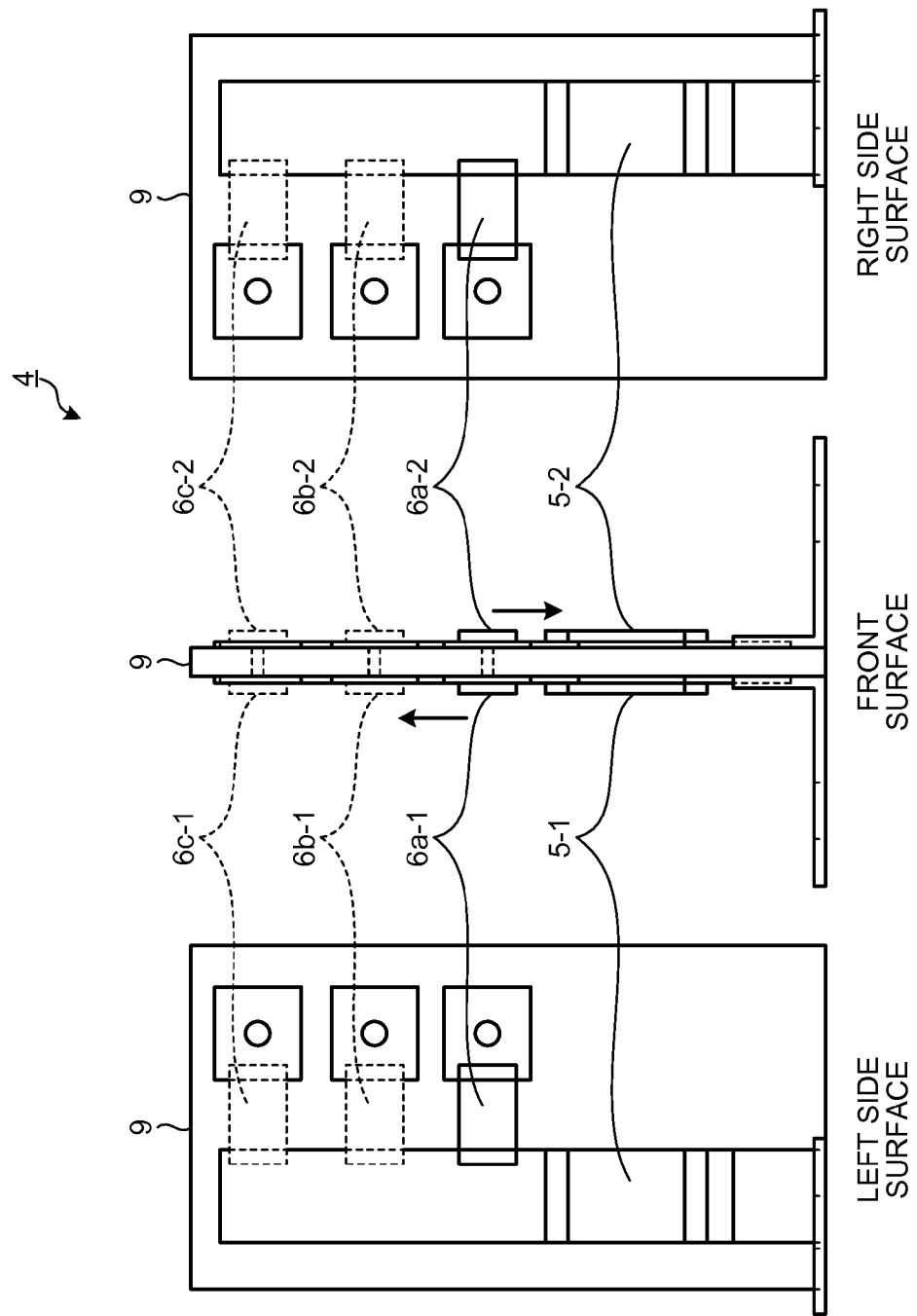
FIG. 9 is a diagram showing an example of mounting a CR snubber circuit according to a second embodiment on the substrate.
Figure 10:
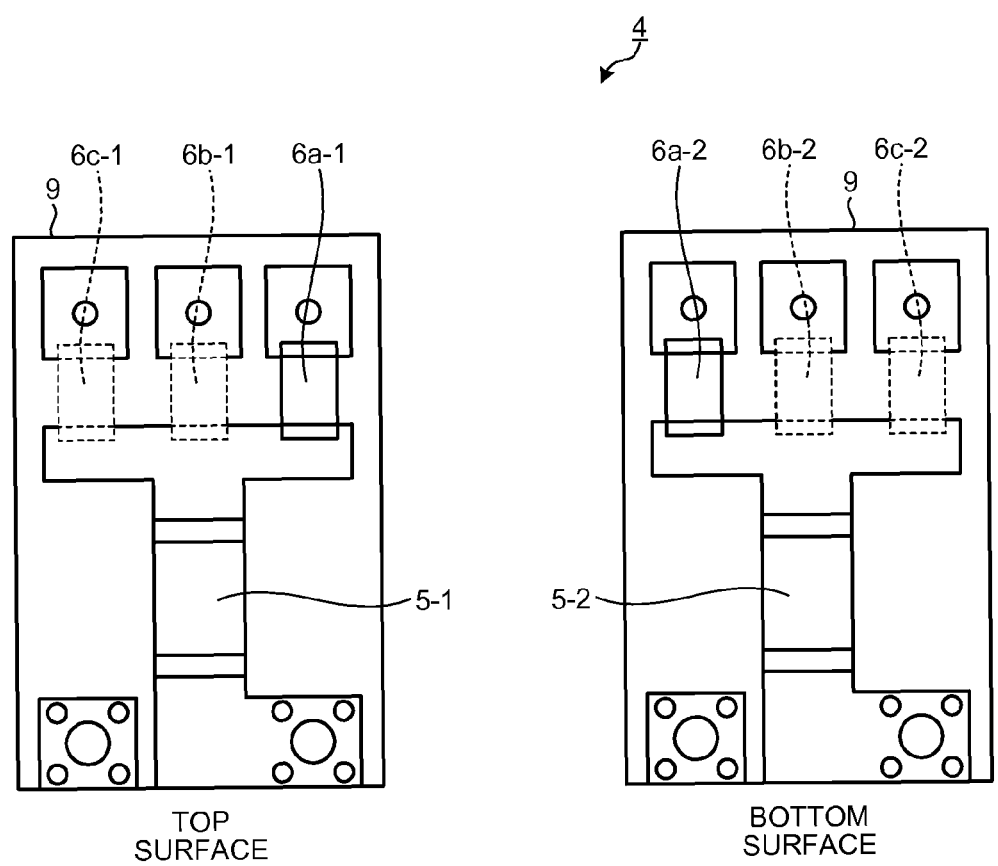
FIG. 10 is a diagram showing an example of mounting, in a different manner from FIG. 9, the CR snubber circuit according to the second embodiment on the substrate.
Figure 11:
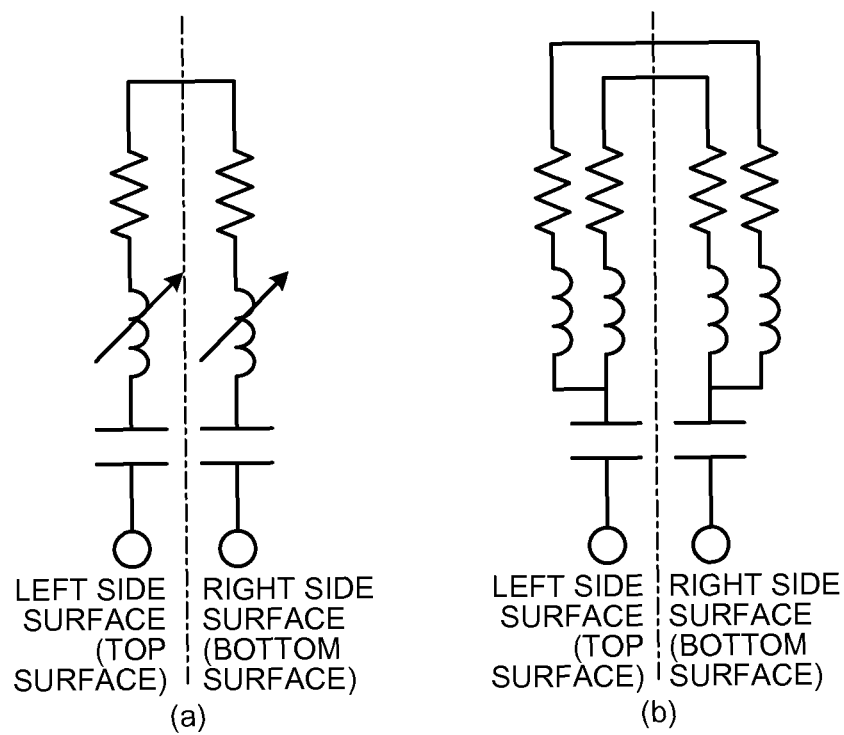
FIG. 11 is a diagram showing equivalent circuits of the CR snubber circuits shown in FIGS. 9 and 10.

FIG. 9 is a diagram showing an example of mounting a CR snubber circuit according to a second embodiment on the substrate. FIG. 10 is a diagram showing an example of mounting, in a different manner from FIG. 9, the CR snubber circuit according to the second embodiment on the substrate. FIG. 11 is a diagram showing equivalent circuits of the CR snubber circuits shown in FIGS. 9 and 10. The example of mounting the substrate, on which the CR snubber circuit shown in FIG. 9 is mounted, on the power semiconductor module is similar to the example of FIG. 5 explained in the first embodiment, and the example of mounting the substrate, on which the CR snubber circuit shown in FIG. 10 is mounted, on the power semiconductor module is similar to the example of FIG. 7 explained in the first embodiment; therefore, explanations thereof will be omitted.

In the first embodiment, while an example of mounting surface-mount type capacitor and resistor on one surface of the double-sided substrate is explained, in the examples shown in FIGS. 9 and 10, surface-mount type capacitor 5-1 and resistor 6a-1 are mounted on one surface (the left side surface in FIG. 9 and the top surface in FIG. 10) of the double-sided substrate 9, surface-mount type capacitor 5-2 and resistor 6a-2 are mounted on the other surface (the right side surface in FIG. 9 and the bottom surface in FIG. 10) of the double-sided substrate 9 (see FIG. 11(a)), the capacitor 5-1 and the capacitor 5-2 are arranged to be opposed to each other with the double-sided substrate 9 being sandwiched therebetween, the resistor 6a-1 and the resistor 6a-2 are arranged to be opposed to each other with the double-sided substrate 9 being sandwiched therebetween, and the first current path formed on one surface of the double-sided substrate 9 and the second current path formed on the other surface of the double-sided substrate 9 are arranged to be opposed to each other with the double-sided substrate 9 being sandwiched therebetween. With this configuration, similarly to the first embodiment, current flows in opposite directions in the first current path and the second current path, and the inductance component included in the first current path and the inductance component included in the second current path are coupled to increase the mutual inductance component. Therefore, the effective inductance component in the whole current path of the CR snubber circuit 4 can be reduced, and thus the capacitance values of the capacitors 5-1 and 5-2 can be made small, thereby facilitating suppression of the ringing component.

Furthermore, in the present embodiment, because the capacitors 5-1 and 5-2 are connected in series and the resistors 6a-1 and 6a-2 are connected in series, the CR snubber circuit can be configured by using parts having a breakdown voltage lower than that of the first embodiment.

Further, the same number of mounting positions for the resistor 6 shown in FIG. 1 is provided on one surface and the other surface of the double-sided substrate 9 and, in the examples shown in FIGS. 9 and 10, the resistors 6a-1 and 6a-2 are mounted at the mounting positions. However, instead of the resistors 6*a*-1 and 6*a*-2, resistors 6*b*-1 and 6*b*-2 or resistors 6*c*-1 and 6*c*-2 can be mounted, and further, combinations of the series circuits of the resistors 6*a*-1 and 6*a*-2, the resistors 6*b*-1 and 6*b*-2, and the resistors 6*c*-1 and 6*c*-2 can be mounted in parallel (see FIG. 11(*b*)). By changing the mounting position and the number of the resistors 6 to be mounted in this way, the inductance component included in the current path and the BEF characteristics can be easily changed. Therefore, the ringing component attenuation effect can be optimized.

As explained above, the CR snubber circuit according to the second embodiment is configured such that, on one surface and the other surface of the double-sided substrate, the surface-mount type capacitors and resistors are arranged to be opposed to each other with the double-sided substrate being sandwiched therebetween, and the first current path formed on one surface of the double-sided substrate and the second current path formed on the other surface of the double-sided substrate are arranged to be opposed to each other with the double-sided substrate being sandwiched therebetween. Accordingly, similarly to the first embodiment, current flows in opposite directions in the first current path and the second current path, and the inductance component included in the first current path and the inductance component included in the second current path are coupled to increase the mutual inductance component. Therefore, the effective inductance component in the whole current path of the CR snubber circuit can be reduced, and thus the capacitance values of the capacitors can be made small, thereby facilitating suppression of the ringing component.

Furthermore, in the present embodiment, because the capacitor on one surface and the capacitor on the other surface are connected in series and the resistor on one surface and the resistor on the other surface are connected in series, the CR snubber circuit can be configured by using parts having a breakdown voltage lower than that of the first embodiment. Further, when the CR snubber circuit is configured by using capacitors having a breakdown voltage equivalent to that of the first embodiment, the CR snubber circuit can be applied to a higher voltage circuit.

Further, because a plurality of mounting positions for the resistor are provided, by changing the mounting position and the number of resistors to be mounted, the inductance component included in the current path and the BEF characteristics can be changed easily. Therefore, the ringing component attenuation effect can be optimized.

Third Embodiment

Figure 12:
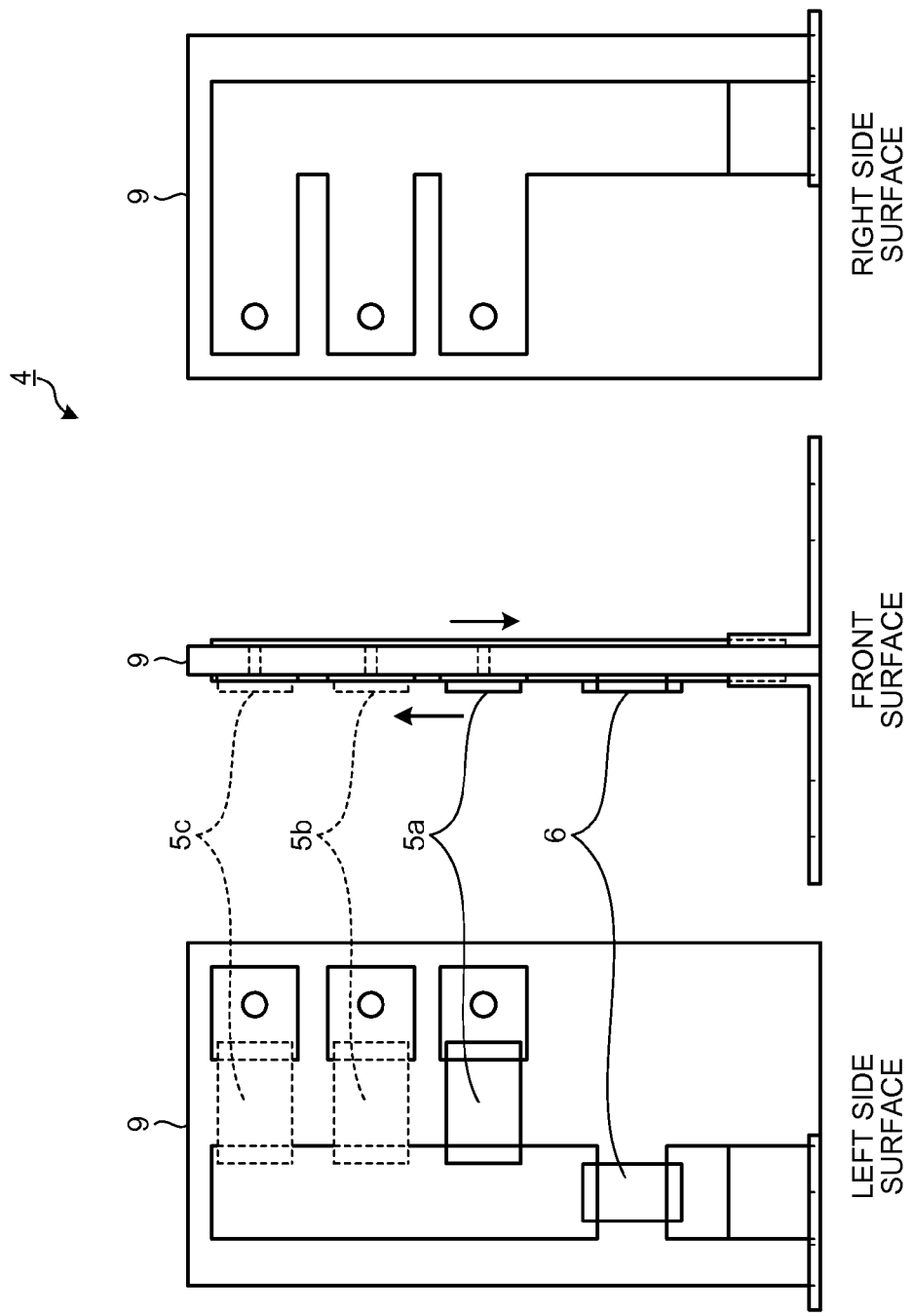
FIG. 12 is a diagram showing an example of mounting a CR snubber circuit according to a third embodiment on the substrate.
Figure 13:
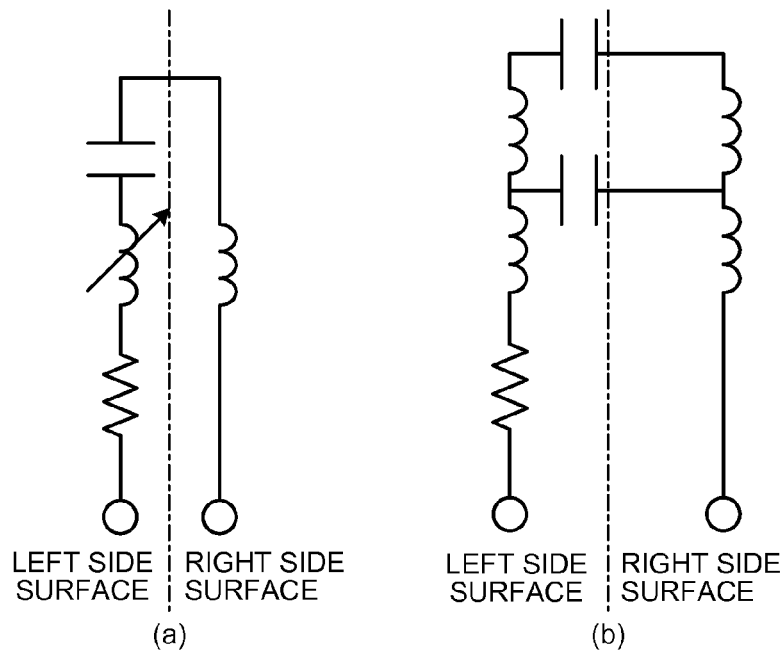
FIG. 13 is a diagram showing equivalent circuits of the CR snubber circuit shown in FIG. 12.
Figure 14:
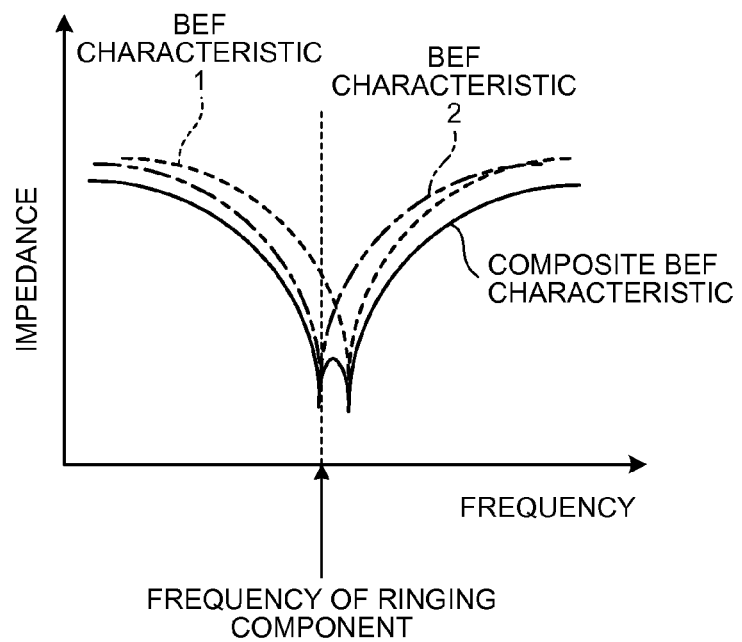
FIG. 14 is a diagram showing an example of the frequency characteristics of the CR snubber circuit according to the third embodiment.

FIG. 12 is a diagram showing an example of mounting a CR snubber circuit according to a third embodiment on the substrate. FIG. 13 is a diagram showing equivalent circuits of the CR snubber circuit shown in FIG. 12. FIG. 14 is a diagram showing an example of the frequency characteristics of the CR snubber circuit according to the third embodiment. The example of mounting the substrate, on which the CR snubber circuit shown in FIG. 12 is mounted, on the power semiconductor module is similar to the example in FIG. 5 explained in the first embodiment; therefore, explanations thereof will be omitted.

While an example of changing the mounting position and the number of resistors to be mounted has been explained in the first and second embodiments, in the example shown in FIG. 12, on one surface (the left side surface in FIG. 12) of the double-sided substrate 9, a plurality of surface-mount type capacitors 5*a*, 5*b*, and 5*c* can be mounted and also the surface-mount type resistor 6 is mounted, and the first current path formed with the inclusion of the capacitors 5*a*, 5*b*, and 5*c* and the resistor 6 is arranged to be opposed to the second current path formed with a wiring pattern on the other surface (the right side surface in FIG. 12) of the double-sided substrate 9 with the double-sided substrate 9 being sandwiched therebetween. With this configuration, by selecting any one of the capacitors 5*a*, 5*b*, and 5*c* and mounting the selected capacitor (see FIG. 13(*a*)), the inductance value can be changed according to the mounting position of the capacitor, and thus the resonant frequency of the BEF can be changed.

Furthermore, by mounting the capacitors 5*a*, 5*b*, and 5*c* in parallel (see FIG. 13(*b*)), BEFs having different resonant frequencies are formed (for example, a BEF characteristic 1 and a BEF characteristic 2 in FIG. 14). Therefore, the BEF characteristics of the CR snubber circuit 4 become a composite BEF characteristic of the plural BEF characteristics (a composite BEF characteristic in FIG. 14). Therefore, as shown in FIG. 14, it is possible to enlarge a frequency range in which the attenuation effect is large with respect to the ringing component frequency.

Further, similarly to the first and second embodiments, current flows in opposite directions in the first current path and the second current path, and the inductance component included in the first current path and the inductance component included in the second current path are coupled to increase the mutual inductance component. Therefore, the effective inductance component in the whole current path of the CR snubber circuit 4 can be reduced, and thus the capacitance values of the capacitors 5*a*, 5*b*, and 5*c* can be made small, thereby facilitating suppression of the ringing component.

As explained above, in the CR snubber circuit according to the third embodiment, because a plurality of mounting positions for the capacitor are provided, the inductance value can be changed according to the mounting position of the capacitor, and thus the resonant frequency of the BEF can be changed.

Furthermore, by mounting the capacitors mounted at different mounting positions in parallel, BEFs having different resonant frequencies are formed. Therefore, it is possible to enlarge a frequency range in which the attenuation effect is large with respect to the ringing component frequency.

Further, similarly to the first and second embodiments, current flows in opposite directions in the first current path and the second current path, and the inductance component included in the first current path and the inductance component included in the second current path are coupled to increase the mutual inductance component. Therefore, the effective inductance component in the whole current path of the CR snubber circuit can be reduced, and thus the capacitance values of the capacitors can be made small, thereby facilitating suppression of the ringing component.

Fourth Embodiment

Figure 15:
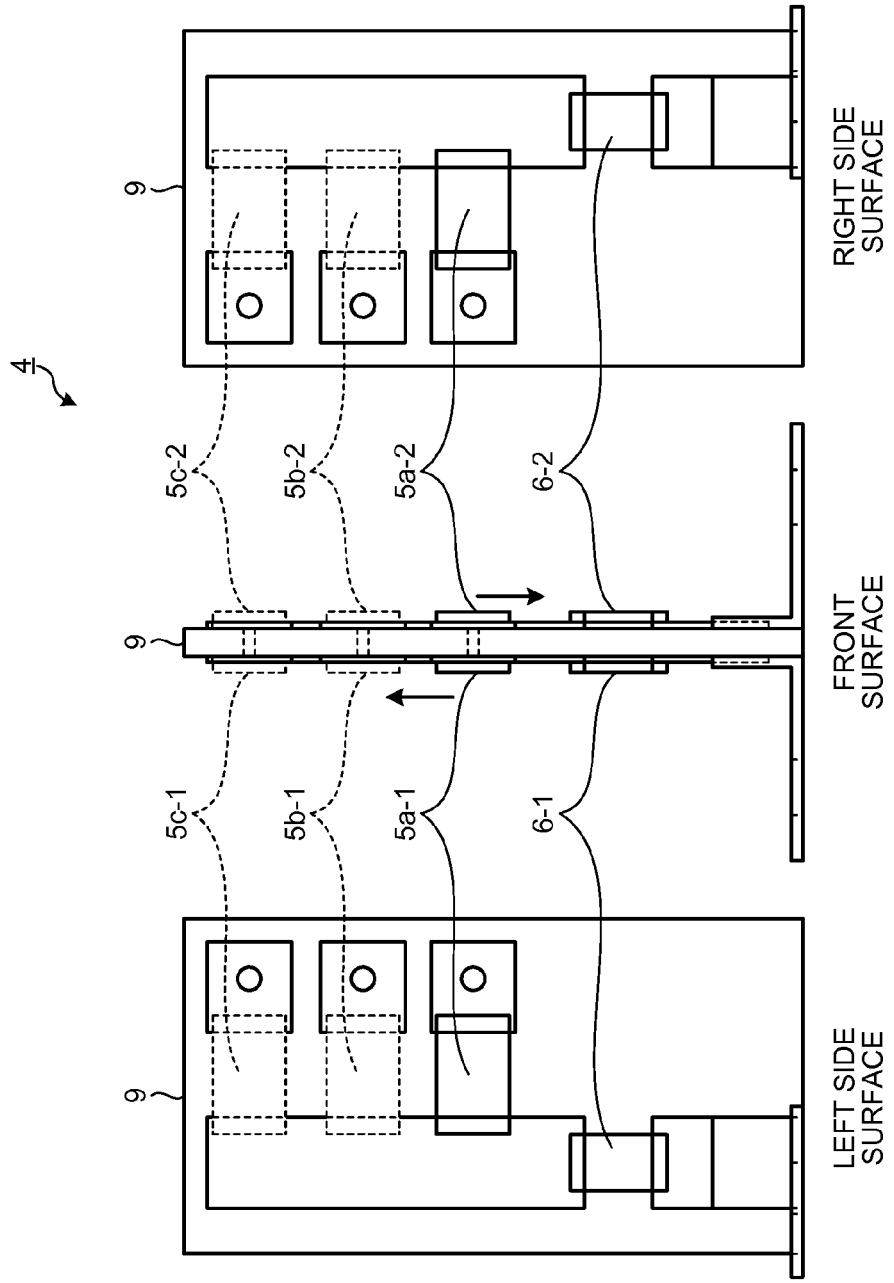
FIG. 15 is a diagram showing an example of mounting a CR snubber circuit according to a fourth embodiment on the substrate.
Figure 16:
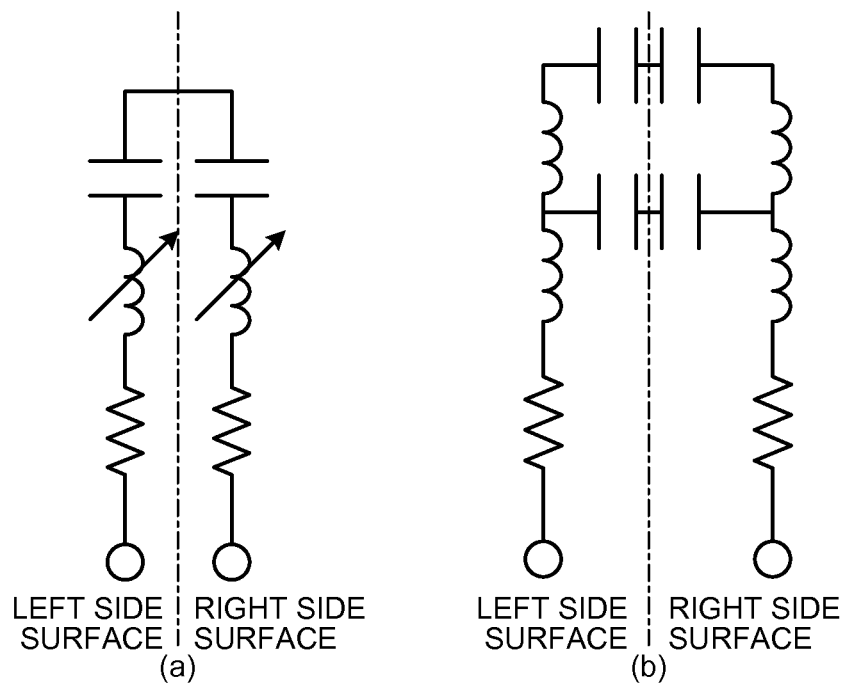
FIG. 16 is a diagram showing equivalent circuits of the CR snubber circuit shown in FIG. 15.

FIG. 15 is a diagram showing an example of mounting a CR snubber circuit according to a fourth embodiment on the substrate. FIG. 16 is a diagram showing equivalent circuits of the CR snubber circuit shown in FIG. 15. The example of mounting the substrate, on which the CR snubber circuit shown in FIG. 15 is mounted, on the power semiconductor module is similar to the example in FIG. 5 explained in the first embodiment; therefore, explanations thereof will be omitted.

In the third embodiment, similarly to the first embodiment, the example of mounting the surface-mount type capacitors and resistor on one surface of the double-sided substrate has been explained. Meanwhile, in the example shown in FIG. 15, on one surface (the left side surface in FIG. 15) of the double-sided substrate 9, a plurality of surface-mount type capacitors 5a-1, 5b-1, and 5c-1 can be mounted and also a surface-mount type resistor 6-1 is mounted, and on the other surface (the right side surface in FIG. 15) of the double-sided substrate 9, a plurality of surface-mount type capacitors 5a-2, 5b-2, and 5c-2 can be mounted and also a surface-mount type resistor 6-2 is mounted, the capacitors 5a-1 and 5a-2, the capacitors 5b-1 and 5b-2, and the capacitors 5c-1 and 5c-2 can be arranged to be opposed to each other with the double-sided substrate 9 being sandwiched therebetween, the resistors 6-1 and 6-2 are arranged to be opposed to each other with the double-sided substrate 9 being sandwiched therebetween, and the first current path formed on one surface of the double-sided substrate 9 and the second current path formed on the other surface of the double-sided substrate 9 are arranged to be opposed to each other with the double-sided substrate 9 being sandwiched therebetween. With this configuration, by selecting any one of the pairs of the capacitors 5a-1 and 5a-2, the capacitors 5b-1 and 5b-2, and the capacitors 5c-1 and 5c-2 and mounting the selected pair (see FIG. 16(a)), the inductance value can be changed according to the mounting position of each pair, and thus, similarly to the third embodiment, the resonant frequency of the BEF can be changed.

Furthermore, by mounting a plurality of pairs of the capacitors 5a-1 and 5a-2, the capacitors 5b-1 and 5b-2, and the capacitors 5c-1 and 5c-2 in parallel (see FIG. 16(b)), BEFs having different resonant frequencies are formed. Therefore, similarly to the third embodiment, it is possible to enlarge a frequency range in which the attenuation effect is large with respect to the ringing component frequency (see FIG. 14).

Further, similarly to the first to third embodiments, current flows in opposite directions in the first current path and the second current path, and the inductance component included in the first current path and the inductance component included in the second current path are coupled to increase the mutual inductance component. Therefore, the effective inductance component in the whole current path of the CR snubber circuit 4 can be reduced, and thus the capacitance values of the capacitors 5a-1 and 5a-2, the capacitors 5b-1 and 5b-2, and the capacitors 5c-1 and 5c-2 can be made small, thereby facilitating suppression of the ringing component.

Furthermore, similarly to the second embodiment, because the capacitors 5a-1 and 5a-2, the capacitors 5b-1 and 5b-2, and the capacitors 5c-1 and 5c-2 are connected in series and the resistors 6-1 and 6-2 are connected in series, the CR snubber circuit can be configured by using parts having a breakdown voltage lower than those of the first and third embodiments. Further, when the CR snubber circuit is configured by using capacitors having a breakdown voltage equivalent to those of the first and third embodiments, the CR snubber circuit can be applied to a higher voltage circuit.

As explained above, in the CR snubber circuit according to the fourth embodiment, similarly to the third embodiment, because a plurality of mounting positions for the capacitor are provided, the inductance value can be changed according to the mounting position of the capacitor, and thus the resonant frequency of the BEF can be changed.

Furthermore, similarly to the third embodiment, by mounting the capacitors mounted at different mounting positions in parallel, BEFs having different resonant frequencies are formed. Therefore, it is possible to enlarge a frequency range in which the attenuation effect is large with respect to the ringing component frequency.

Further, similarly to the first to third embodiments, current flows in opposite directions in the first current path and the second current path, and the inductance component included in the first current path and the inductance component included in the second current path are coupled to increase the mutual inductance component. Therefore, the effective inductance component in the whole current path of the CR snubber circuit can be reduced, and thus the capacitance values of the capacitors can be made small, thereby facilitating suppression of the ringing component.

Furthermore, similarly to the second embodiment, in the present embodiment, because the capacitor on one surface and the capacitor on the other surface are connected in series and the resistor on one surface and the resistor on the other surface are connected in series, the CR snubber circuit can be configured by using parts having a breakdown voltage lower than those of the first and third embodiments.

Fifth Embodiment

Figure 17:
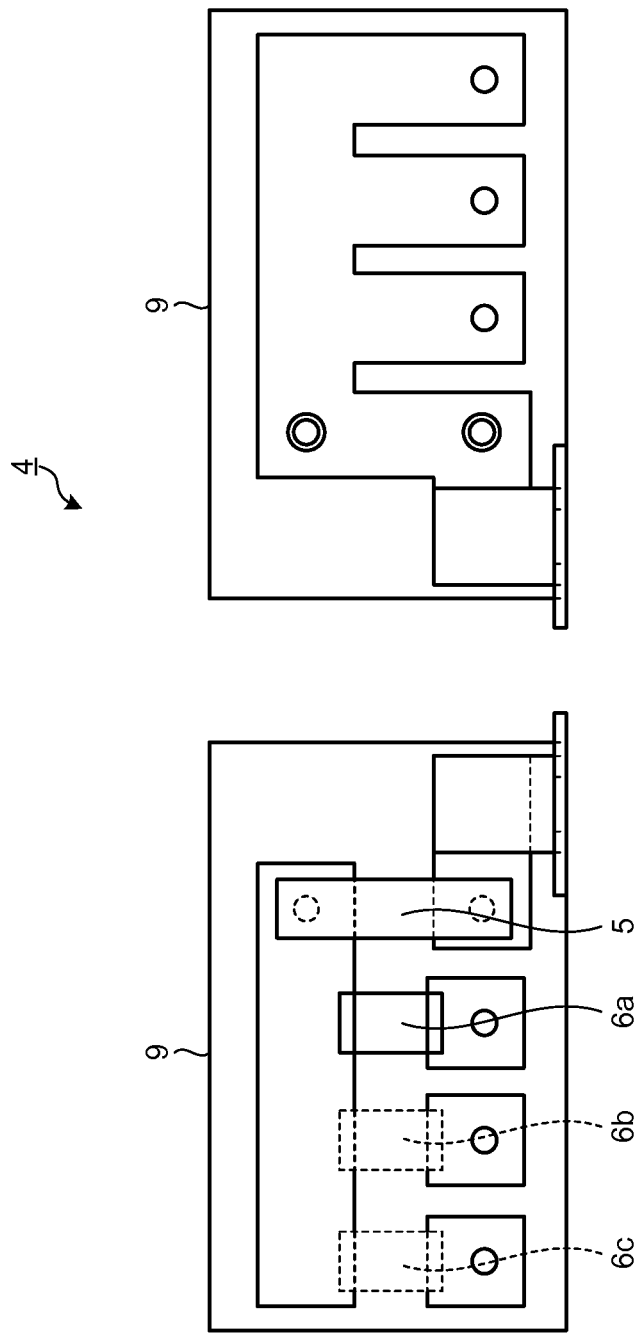
FIG. 17 is a diagram showing an example of mounting a CR snubber circuit according to a fifth embodiment on the substrate.

FIG. 17 is a diagram showing an example of mounting a CR snubber circuit according to a fifth embodiment on the substrate. Because the equivalent circuits of the CR snubber circuit shown in FIG. 17 are similar to those in FIG. 8 explained in the first embodiment, explanations thereof will be omitted. In addition, the example of mounting the substrate, on which the CR snubber circuit shown in FIG. 17 is mounted, on the power semiconductor module is similar to the example of FIG. 5 explained in the first embodiment, explanations thereof will be omitted.

In contrast to FIG. 4 explained in the first embodiment, the example shown in FIG. 17 differs from that shown in FIG. 4 in that the capacitor 5 is configured by a discrete part.

Figure 18:
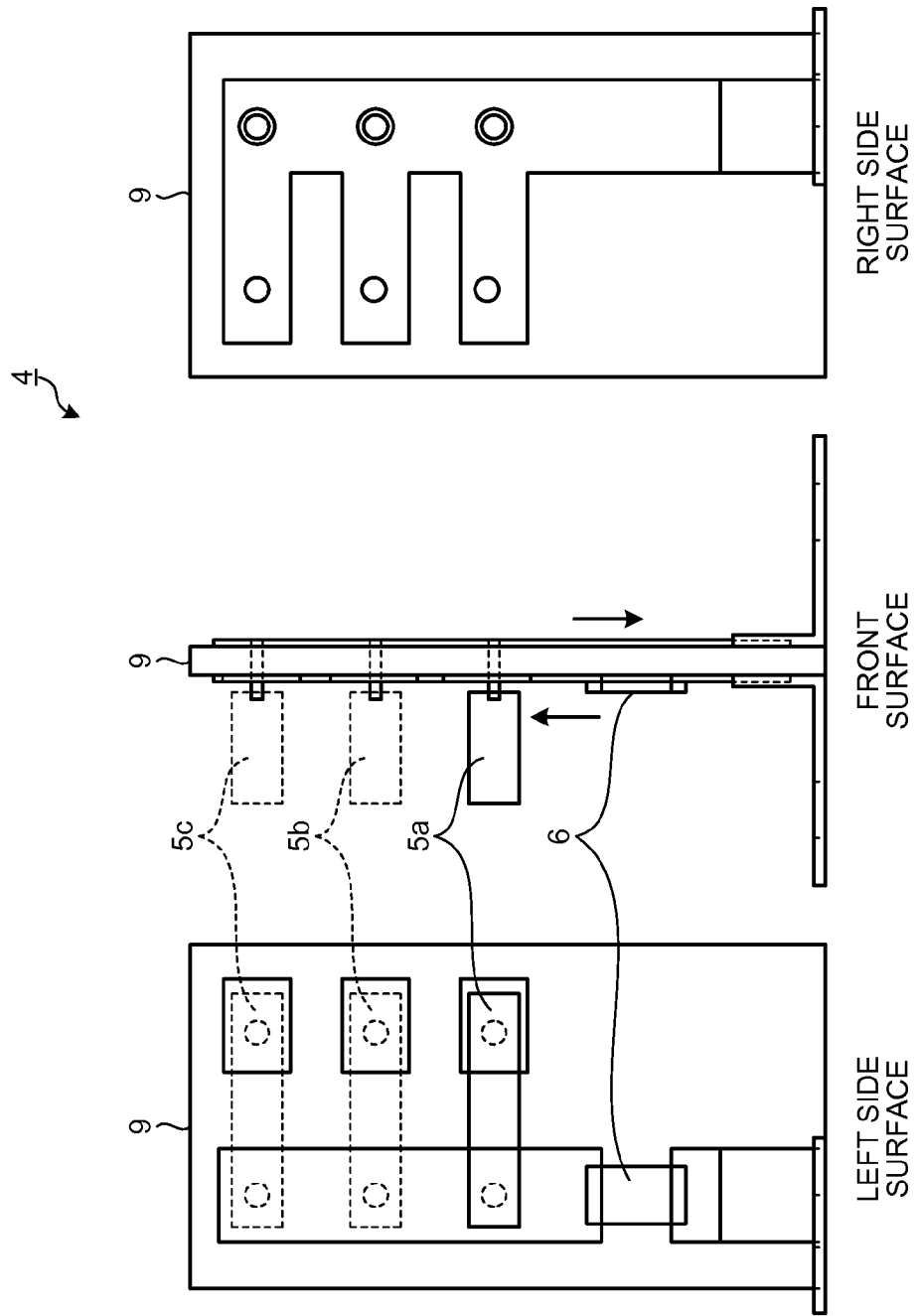
FIG. 18 is a diagram showing an example of mounting, in a different manner from FIG. 17, the CR snubber circuit according to the fifth embodiment on the substrate.

FIG. 18 is a diagram showing an example of mounting, in a different manner from FIG. 17, the CR snubber circuit according to the fifth embodiment on the substrate. Because the equivalent circuits of the CR snubber circuit shown in FIG. 18 are similar to those in FIG. 13 explained in the third embodiment, explanations thereof will be omitted. In addition, the example of mounting the substrate, on which the CR snubber circuit shown in FIG. 18 is mounted, on the power semiconductor module, is similar to the example of FIG. 5 explained in the first embodiment, explanations thereof will be omitted.

In contrast to FIG. 12 explained in the third embodiment, the example shown in FIG. 18 differs from that shown in FIG. 12 in that the capacitors 5a, 5b, and 5c are configured by discrete parts.

Figure 19:
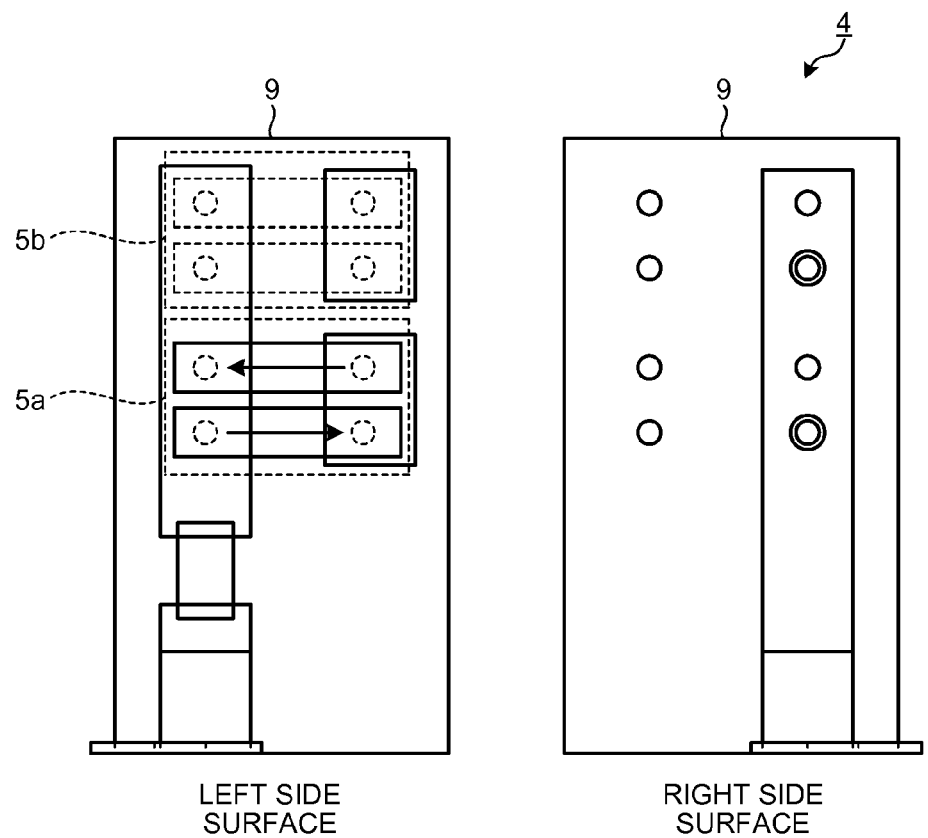
FIG. 19 is a diagram showing an example of mounting, in a different manner from FIGS. 17 and 18, the CR snubber circuit according to the fifth embodiment on the substrate.
Figure 20:
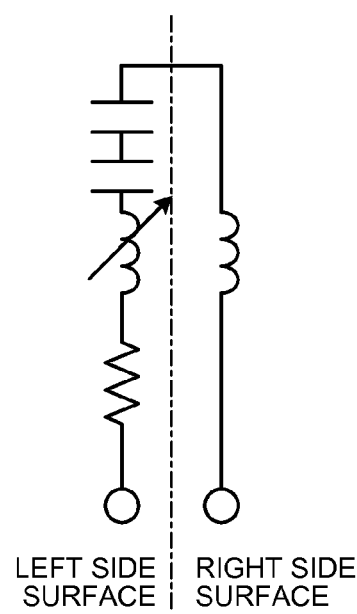
FIG. 20 is a diagram showing an equivalent circuit of the CR snubber circuit shown in FIG. 19.

FIG. 19 is a diagram showing an example of mounting, in a different manner from FIGS. 17 and 18, the CR snubber circuit according to the fifth embodiment on the substrate. FIG. 20 is a diagram showing an equivalent circuit of the CR snubber circuit shown in FIG. 19. Because the example of mounting the substrate, on which the CR snubber circuit shown in FIG. 19 is mounted, on the power semiconductor module is similar to the example of FIG. 5 explained in the first embodiment, explanations thereof will be omitted.

In contrast to the example shown in FIG. 18, the example shown in FIG. 19 differs from that shown in FIG. 18 in that each of the capacitors 5a and 5b is configured by connecting two discrete parts in series.

Generally, surface-mount type capacitors have a low breakdown voltage. In the present embodiment, as shown in FIGS. 17 to 19, by configuring the capacitor 5 that constitutes the CR snubber circuit 4 with a discrete part, a high breakdown voltage can be achieved.

In this way, even when the capacitor 5 is configured by a discrete part, effects similar to those of the first to fourth embodiments described above can be obtained.

As explained above, the CR snubber circuit according to the fifth embodiment can obtain effects similar to those of the first to fourth embodiments. Furthermore, by configuring a capacitor by a discrete part, a high breakdown voltage can be achieved.

Sixth Embodiment

Figure 21:
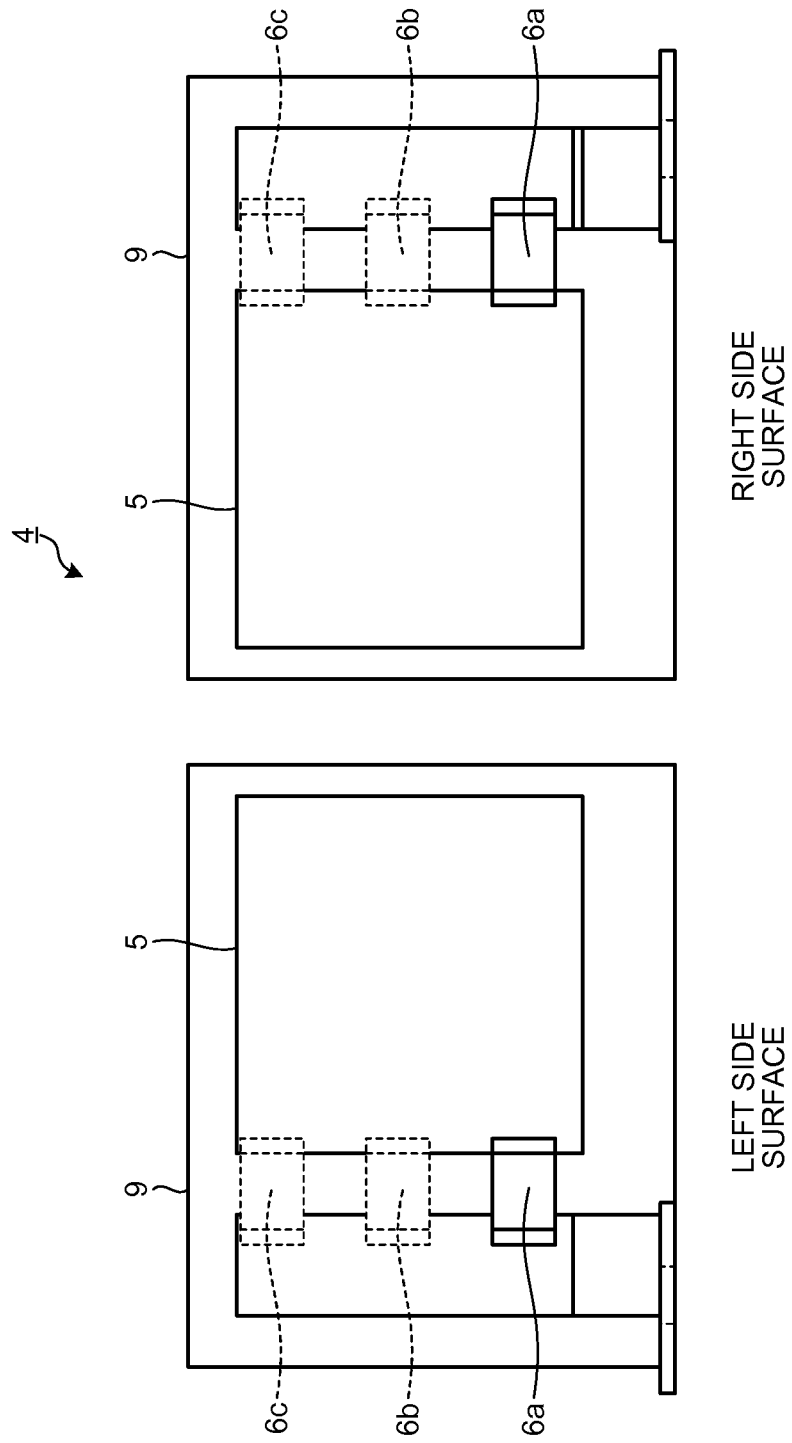
FIG. 21 is a diagram showing an example of mounting a CR snubber circuit according to a sixth embodiment on the substrate.
Figure 22:
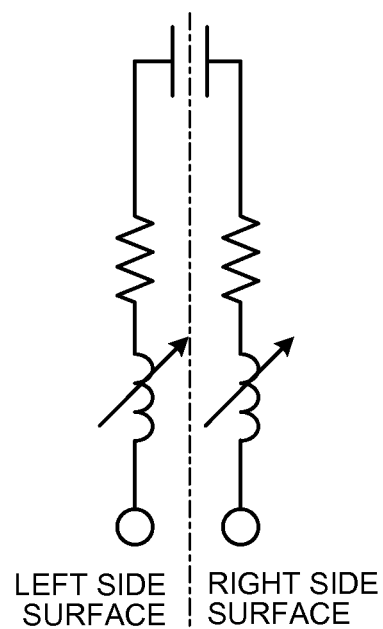
FIG. 22 is a diagram showing an equivalent circuit of the CR snubber circuit shown in FIG. 21.

FIG. 21 is a diagram showing an example of mounting a CR snubber circuit according to a sixth embodiment on the substrate. FIG. 22 is a diagram showing an equivalent circuit of the CR snubber circuit shown in FIG. 21. Because an example of mounting the substrate, on which the CR snubber circuit shown in FIG. 21 is mounted, on the power semiconductor module is similar to the example of FIG. 5 explained in the first embodiment, explanations thereof will be omitted.

The example shown in FIG. 21 is an example in which the capacitor 5 that constitutes the CR snubber circuit 4 is formed with a substrate pattern (copper foil) on the double-sided substrate 9. As explained in the first embodiment, by arranging the first current path formed on one surface of the double-sided substrate 9 and the second current path formed on the other surface of the double-sided substrate 9 to be opposed to each other with the double-sided substrate 9 being sandwiched therebetween, current flows in opposite directions in the first current path and the second current path and the inductance component included in the first current path and the inductance component included in the second current path are coupled to increase the mutual inductance component. Therefore, the effective inductance component in the whole current path of the CR snubber circuit 4 can be reduced, and thus the capacitance value of the capacitor 5 can be made small. Accordingly, as shown in FIG. 21, it becomes possible to form the capacitor 5 with a substrate pattern on the double-sided substrate 9.

In this way, even when the capacitor 5 is formed with a substrate pattern, effects similar to those of the first to fourth embodiments described above can be obtained, and a reduction of the number of parts can be achieved.

Figure 23:
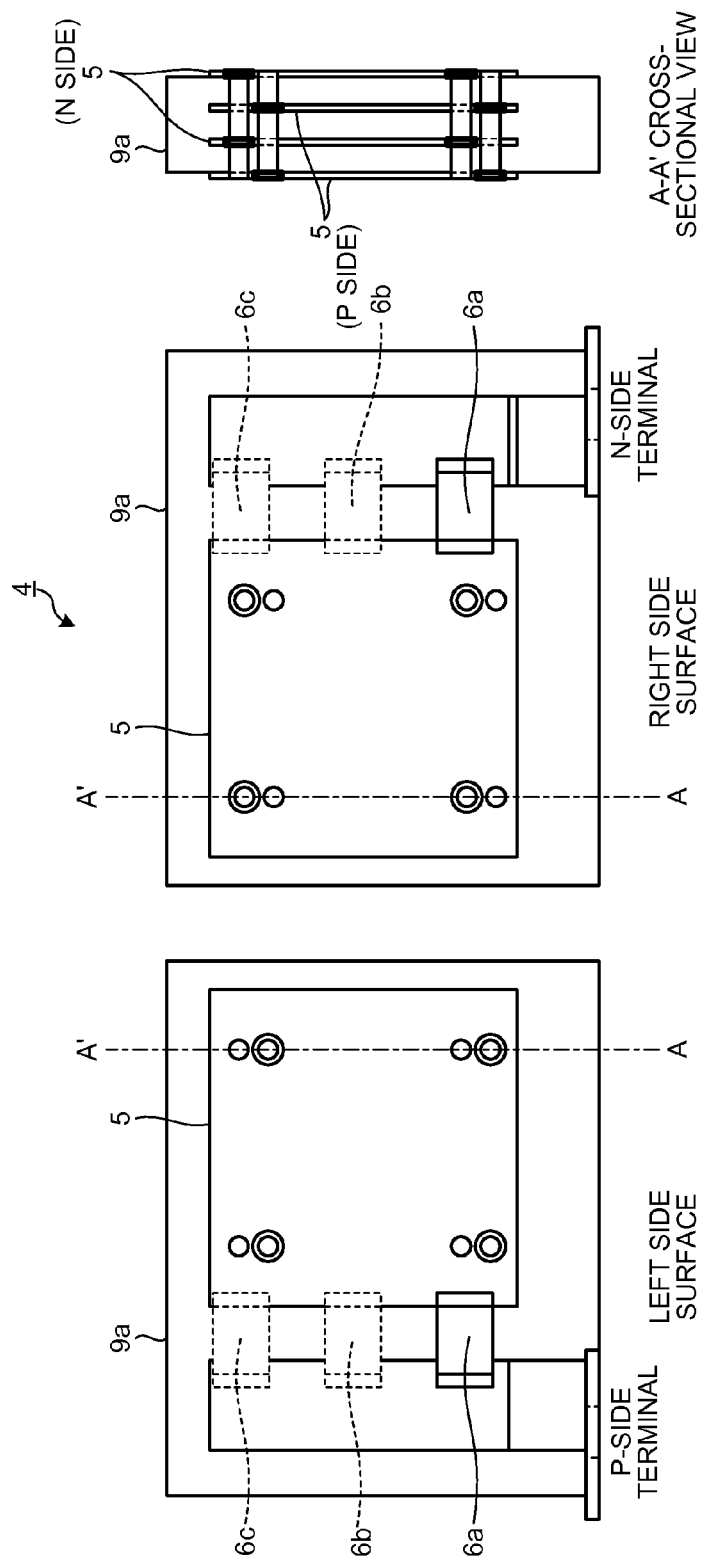
FIG. 23 is a diagram showing an example of mounting, in a different manner from FIG. 21, the CR snubber circuit according to the sixth embodiment on the substrate.

FIG. 23 is a diagram showing an example of mounting, in a different manner from FIG. 21, the CR snubber circuit according to the sixth embodiment on the substrate. Because an example of mounting the substrate, on which the CR snubber circuit shown in FIG. 23 is mounted, on the power semiconductor module is similar to the example of FIG. 5 explained in the first embodiment, explanations thereof will be omitted.

In the example of FIG. 23, a four-layer substrate 9a is used instead of the double-sided substrate 9 shown in FIG. 21. By forming the capacitor 5 using a substrate pattern on a plurality of layers of a multilayer substrate with four or more layers, the area of the capacitor 5 occupying the substrate surface can be made small.

As explained above, the CR snubber circuit according to the sixth embodiment can obtain effects similar to those of the first to fourth embodiments. Furthermore, by forming a capacitor with a substrate pattern, a reduction of the number of parts can be achieved.

By forming a capacitor using a substrate pattern on a plurality of layers of a multilayer substrate with four or more layers, the area of the capacitor occupying the substrate surface can be made small.

Seventh Embodiment

Figure 24:
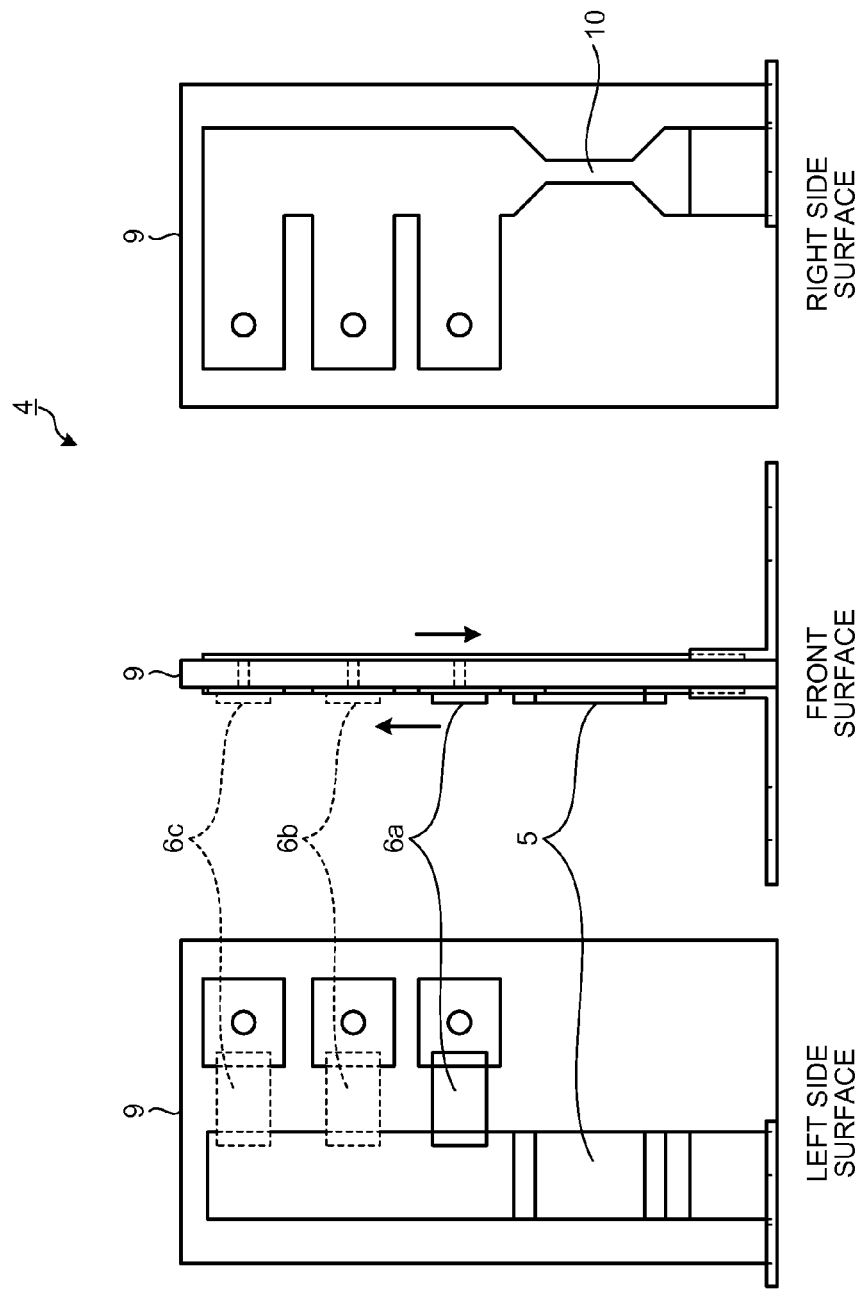
FIG. 24 is a diagram showing an example of mounting a CR snubber circuit according to a seventh embodiment on the substrate.
Figure 25:
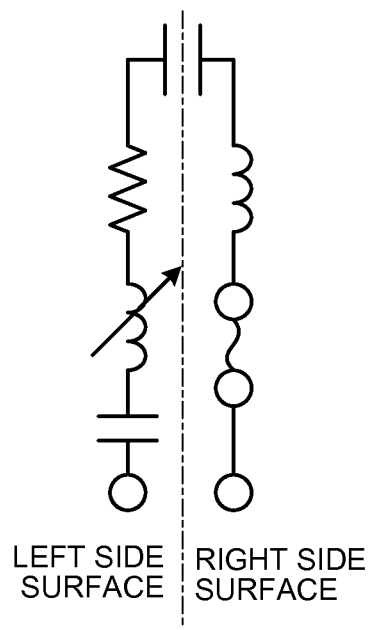
FIG. 25 is a diagram showing an equivalent circuit of the CR snubber circuit shown in FIG. 24.

FIG. 24 is a diagram showing an example of mounting a CR snubber circuit according to a seventh embodiment on the substrate. FIG. 25 is a diagram showing an equivalent circuit of the CR snubber circuit shown in FIG. 24. Because an example of mounting the substrate, on which the CR snubber circuit shown in FIG. 24 is mounted, on the power semiconductor module is similar to the example of FIG. 5 explained in the first embodiment, explanations thereof will be omitted.

Similarly to the first embodiment, in the example shown in FIG. 24, the surface-mount type capacitor 5 and resistor 6a are mounted on one surface (the left side surface in FIG. 24) of the double-sided substrate 9 (see FIG. 25), and the first current path formed with the inclusion of the capacitor 5 and the resistor 6a is arranged to be opposed to the second current path formed with a wiring pattern on the other surface (the right side surface in FIG. 24) of the double-sided substrate 9 with the double-sided substrate 9 being sandwiched therebetween. With this configuration, current flows in opposite directions in the first current path and the second current path (see the front view in FIG. 24), and the inductance component included in the first current path and the inductance component included in the second current path are coupled to increase the mutual inductance component. Therefore, the effective inductance component in the whole current path of the CR snubber circuit 4 can be reduced, and thus the capacitance value of the capacitor 5 can be made small, thereby facilitating suppression of the ringing component.

Similarly to the first embodiment, in the example shown in FIG. 24, a plurality of mounting positions for the resistor 6 shown in FIG. 1 are provided, and the resistor 6a is mounted at the mounting position. However, the resistor 6b or the resistor 6c can be mounted instead of the resistor 6a, and the resistors 6a to 6c can be mounted and in parallel. By changing the mounting position and the number of the resistors 6 to be mounted in this way, the inductance component included in the current path and the BEF characteristics can be easily changed. Therefore, the ringing component attenuation effect can be optimized.

Furthermore, in the present embodiment, a pattern fuse 10 formed with a substrate pattern is provided on the other surface (the right side surface in FIG. 24) of the double-sided substrate 9 (see FIG. 25). For example, when the capacitor 5 has a short-circuit breakdown, there is a risk of an overcurrent flowing between the DC terminals P and N of the power semiconductor module 100. However, in the present embodiment, the pattern fuse 10 mentioned above is provided. Therefore, when an overcurrent flows due to the short-circuit of parts or the like, the pattern fuse 10 is blown out. Accordingly, the DC power supply 1, externally-connected devices, and the like can be protected.

In the example shown in above-mentioned FIG. 24, although a configuration example in which the configuration described in the first embodiment is provided with the pattern fuse 10 is shown, it goes without saying that it is also possible to have a configuration in which the configurations explained in the second to sixth embodiments described above is provided with the pattern fuse 10.

As explained above, the CR snubber circuit according to the seventh embodiment can obtain effects similar to those of the first to fourth embodiments described above. Furthermore, by forming a pattern fuse with a substrate pattern, when an overcurrent is about to flow due to the short-circuit of parts or the like, the pattern fuse is blown out; therefore, a DC power supply, externally-connected devices, and the like can be protected.

Eighth Embodiment

Figure 26:
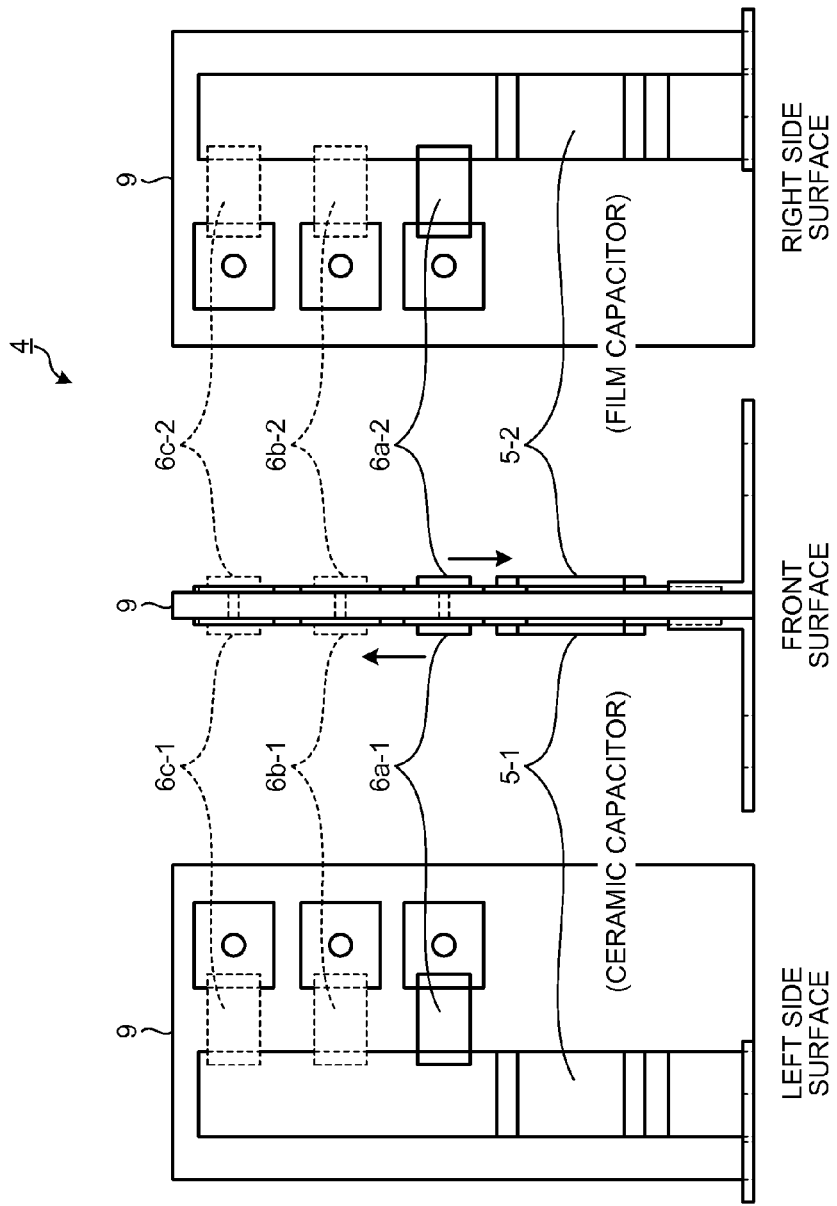
FIG. 26 is a diagram showing an example of mounting a CR snubber circuit according to an eighth embodiment on the substrate.

FIG. 26 is a diagram showing an example of mounting a CR snubber circuit according to an eighth embodiment on the substrate. Because the equivalent circuits of the CR snubber circuit shown in FIG. 26 are similar to those in FIG. 11 explained in the second embodiment, explanations thereof will be omitted. In addition, because an example of mounting the substrate, on which the CR snubber circuit shown in FIG. 26 is mounted, on the power semiconductor module is similar to the example of FIG. 5 explained in the first embodiment, explanations thereof will be omitted.

In the example shown in FIG. 26, similarly to the second embodiment, the surface-mount type capacitor 5-1 and resistor 6a-1 are mounted on one surface (the left side surface in FIG. 26) of the double-sided substrate 9, the surface-mount type capacitor 5-2 and resistor 6a-2 are mounted on the other surface (the right side surface in FIG. 26) of the double-sided substrate 9, the capacitor 5-1 and the capacitor 5-2 are arranged to be opposed to each other with the double-sided substrate 9 being sandwiched therebetween, the resistor 6a-1 and the resistor 6a-2 are arranged to be opposed to each other with the double-sided substrate 9 being sandwiched therebetween, and the first current path formed on one surface of the double-sided substrate 9 and the second current path formed on the other surface of the double-sided substrate 9 are arranged to be opposed to each other with the double-sided substrate 9 being sandwiched therebetween. With this configuration, similarly to the second embodiment, current flows in opposite directions in the first current path and the second current path, and the inductance component included in the first current path and the inductance component included in the second current path are coupled to increase the mutual inductance component. Therefore, the effective inductance component in the whole current path of the CR snubber circuit 4 can be reduced, and thus the capacitance values of the capacitors 5-1 and 5-2 can be made small, thereby facilitating suppression of the ringing component.

Furthermore, similarly to the second embodiment, because the capacitors 5-1 and 5-2 are connected in series and the resistors 6a-1 and 6a-2 are connected in series, the CR snubber circuit can be configured by using parts having a breakdown voltage lower than that of the first embodiment. Further, when the CR snubber circuit is configured by using capacitors having a breakdown voltage equivalent to that of the first embodiment, the CR snubber circuit can be applied to the circuit to a higher voltage circuit.

Further, similarly to the second embodiment, the same number of mounting positions for the resistor 6 shown in FIG. 1 is provided one surface and the other surface of the double-sided substrate 9 and, in the example shown in FIG. 26, the resistors 6a-1 and 6a-2 are mounted at the mounting positions. However, instead of the resistors 6a-1 and 6a-2, the resistors 6b-1 and 6b-2 or the resistors 6c-1 and 6c-2 can be mounted, and further, combinations of the series circuits of the resistors 6a-1 and 6a-2, the resistors 6b-1 and 6b-2, and the resistors 6c-1 and 6c-2 can be mounted in parallel.

By changing the mounting position and the number of the resistors 6 to be mounted in this way, similarly to the second embodiment, the inductance component included in the current path and the BEF characteristics can be easily changed. Therefore, the ringing component attenuation effect can be optimized.

Furthermore, in the present embodiment, the capacitor 5-1 mounted on one surface of the double-sided substrate 9 is a ceramic capacitor and the capacitor 5-2 mounted on the other surface is a film capacitor (see FIG. 26).

Generally, while ceramic capacitors can easily achieve a breakdown voltage higher than that of film capacitors, for example, when an overcurrent is about to flow at the time of overvoltage, there is a risk of causing a short-circuit breakdown. In the present embodiment, as described above, by using a ceramic capacitor as the capacitor 5-1 mounted on one surface of the double-sided substrate 9 and a film capacitor as the capacitor 5-2 mounted on the other surface, when the capacitor 5-1, which is a ceramic capacitor, causes a short-circuit breakdown and an overcurrent is about to flow, the capacitor 5-2, which is a film capacitor, causes a non-conductive breakdown, thereby the DC power source 1, externally-connected devices, and the like can be protected.

In the example shown in FIG. 26 described above, configuration example is shown in which the capacitor 5-1 mounted on one surface of the double-sided substrate 9 is a ceramic capacitor and the capacitor 5-2 mounted on the other surface is a film capacitor. However, it is also possible to have a configuration in which the capacitor 5-1 mounted on one surface of the double-sided substrate 9 is a film capacitor and the capacitor 5-2 mounted on the other surface is a ceramic capacitor, or, for example, as shown in FIG. 19 explained in the fifth embodiment, in the configuration where a plurality of capacitors are connected in series to form the capacitor 5, even when one of the capacitors is a ceramic capacitor and the other one is a film capacitor, it goes without saying that effects similar to those of the configuration shown in FIG. 26 described in the present embodiment can be obtained.

In the configuration described above in which a ceramic capacitor and a film capacitor are connected in series, because a higher voltage is applied to one of the capacitors with a smaller capacitance value, it is preferable to make the ceramic capacitor, which is capable of achieving a breakdown voltage higher than that of the film capacitor, have a capacitance value smaller than that of the film capacitor.

Furthermore, also in a configuration in which three or more capacitors are connected in series, by using a film capacitor for any one or more of the capacitors, the above-described effects can be obtained.

As explained above, the CR snubber circuit according to the eighth embodiment can obtain effects similar to those of the first to fourth embodiments described above. Further, by using a film capacitor for any one or more of a plurality of capacitors connected in series, when other capacitors cause a short-circuit breakdown and an overcurrent is about to flow, the film capacitor causes a non-conductive breakdown, thereby the DC power supply, externally-connected devices, and the like can be protected.

The configurations described in the above embodiments are only examples of the configurations of the present invention and it is obvious that the configurations can be combined with other publicly known technologies and the configurations can be changed, for example, by omitting a part thereof without departing from the scope of the present invention.

INDUSTRIAL APPLICABILITY

As described above, the present invention is useful as a technology for improving a reduction effect of the effective inductance component of the CR snubber circuit, and is particularly suitable for suppressing the ringing component that is generated when the switching element included in the power semiconductor module is switched on.

REFERENCE SIGNS LIST

1 DC power supply, 2 smoothing capacitor, 3 snubber capacitor, 4 CR snubber circuit, 5, 5-1, 5-2, 5*a*-1, 5*a*-2, 5*b*-1, 5*b*-2, 5*c*-1, 5*c*-2 capacitor, 6, 6-1, 6-2, 6*a*-1, 6*a*-2, 6*b*-1, 6*b*-2, 6*c*-1, 6*c*-2 resistor, 7*a* to 7*f* switching element, 9 double-sided substrate (substrate), 9*a* four layer substrate (substrate), 10 pattern fuse, 100 power semiconductor module.

The invention claimed is:

1. A CR snubber circuit that is formed on a substrate and that includes a capacitor and a resistor that are connected in series between DC terminals that apply DC voltage to a power semiconductor module that is formed with inclusion of a switching element, wherein
a first current path formed on one surface of the substrate and a second current path formed on another surface, which is an opposite side of the one surface of the substrate, are opposed to each other with the substrate being sandwiched therebetween, the capacitor and the resistor are arranged such that current flows in opposite directions in the first current path and the second current path, and a band elimination filter is formed by the capacitor, the resistor, and an effective inductance component obtained by coupling an inductance component included in the first current path and an inductance component included in the second current path.

2. The CR snubber circuit according to claim 1, wherein the resistor is capable of being mounted at a plurality of positions on the substrate.

3. The CR snubber circuit according to claim 1, wherein the resistor is mounted singularly or a plurality of the resistors are mounted in parallel or in series.

4. The CR snubber circuit according to claim 1, wherein the capacitor is capable of being mounted at a plurality of positions on the substrate.

5. The CR snubber circuit according to claim 1, wherein the capacitor is mounted singularly or a plurality of the capacitors are mounted in parallel or in series.

6. The CR snubber circuit according to claim 1, wherein a plurality of the resistors are connected in series, and the resistors are arranged to be opposed to each other with the substrate being sandwiched therebetween.

7. The CR snubber circuit according to claim 1, wherein a plurality of the capacitors are connected in series, and the capacitors are arranged to be opposed to each other with the substrate being sandwiched therebetween.

8. The CR snubber circuit according to claim 1, wherein the capacitor is configured by a discrete part.

9. The CR snubber circuit according to claim 1, wherein the capacitor is formed using a substrate pattern on the substrate.

10. The CR snubber circuit according to claim 1, wherein a pattern fuse is formed using a substrate pattern on the substrate.

11. The CR snubber circuit according to claim 1, wherein at least one of the capacitors connected in series is a film capacitor.

12. The CR snubber circuit according to claim 11, wherein a capacitance of a capacitor other than the film capacitor is smaller than a capacitance of the film capacitor.

* * * * *